US010486611B1

(12) United States Patent
Klindt

(10) Patent No.: US 10,486,611 B1
(45) Date of Patent: *Nov. 26, 2019

(54) ASSEMBLY AND ADAPTER FOR SUPPORTING AN APPARATUS ON A VEHICLE TOW HITCH ASSEMBLY

(71) Applicant: Jan R. Klindt, Auberry, CA (US)

(72) Inventor: Jan R. Klindt, Auberry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,681

(22) Filed: May 27, 2018

Related U.S. Application Data

(63) Continuation-in-part of application No. 13/015,452, filed on Jan. 27, 2011.

(51) Int. Cl.
| | |
|---|---|
| *B60D 1/07* | (2006.01) |
| *B60R 9/06* | (2006.01) |
| *B60R 9/10* | (2006.01) |
| *B60D 1/58* | (2006.01) |
| *B60D 1/52* | (2006.01) |

(52) U.S. Cl.
CPC ............ *B60R 9/06* (2013.01); *B60D 1/52* (2013.01); *B60D 1/58* (2013.01); *B60R 9/10* (2013.01); *B60D 1/075* (2013.01)

(58) Field of Classification Search
CPC ... B60R 11/00; B60R 9/06; B60R 2011/0049; B60R 2011/0061; B60D 1/075; B60D 1/58
USPC ........................................................ 224/519
See application file for complete search history.

(56) References Cited

U.S. PATENT DOCUMENTS

| | | | | | |
|---|---|---|---|---|---|
| 4,046,398 A | * | 9/1977 | Dunwoody | ............. | B60D 1/46 224/519 |
| 4,050,714 A | * | 9/1977 | Epp | ......................... | B60D 1/06 280/495 |
| 4,301,953 A | * | 11/1981 | Abbott | ..................... | B60R 9/06 224/519 |
| 4,380,344 A | * | 4/1983 | Abbott | ..................... | B60R 9/06 224/519 |
| 4,856,686 A | * | 8/1989 | Workentine | ............. | B60R 9/06 224/497 |
| 5,593,172 A | * | 1/1997 | Breslin | .................. | B60D 1/155 280/491.5 |
| 5,884,930 A | * | 3/1999 | Cluth | ....................... | B60D 1/07 224/519 |
| 6,010,144 A | * | 1/2000 | Breslin | .................. | B60D 1/155 280/491.5 |

(Continued)

*Primary Examiner* — Justin M Larson
(74) *Attorney, Agent, or Firm* — Richard A. Ryan

(57) ABSTRACT

A support assembly for use with a tow hitch assembly attached to a vehicle that is utilized to support an apparatus which can be used with the vehicle and/or be utilized to carry bicycles or other items while simultaneously towing a towable vehicle. The support assembly provides a second receiver that supports the apparatus. The second receiver is attached to or integral with a component tube that is attached to the tow hitch assembly or an adapter attached to the tow hitch assembly. The adapter engages the exterior surfaces of the tow hitch assembly to not interfere with the tube opening that receives a hitch shaft of a towable vehicle. The adapter has an adapter collar, pair of side members that extend rearwardly from the adapter collar and a pair of arms that extend forwardly to connect the side members to the receiver of the tow hitch assembly.

27 Claims, 21 Drawing Sheets

(56) References Cited

U.S. PATENT DOCUMENTS

| | | | | |
|---|---|---|---|---|
| 6,089,431 | A * | 7/2000 | Heyworth | B60D 1/075 224/521 |
| 6,179,311 | B1 * | 1/2001 | Larkin | B62D 25/188 280/154 |
| 6,186,531 | B1 * | 2/2001 | Parent | B60D 1/52 224/519 |
| 6,874,804 | B2 * | 4/2005 | Reese | B60D 1/06 224/520 |
| 6,915,999 | B2 * | 7/2005 | Wang | B60R 9/06 248/534 |
| 7,533,789 | B1 * | 5/2009 | Seely | B60R 9/06 224/282 |
| 7,621,554 | B1 * | 11/2009 | Cremer | B60D 1/66 280/476.1 |
| 7,784,813 | B2 | 8/2010 | Columbia | |
| D652,775 | S * | 1/2012 | Spera | D12/203 |
| 8,640,936 | B2 * | 2/2014 | Ort | B60R 11/00 224/519 |
| 9,333,822 | B1 * | 5/2016 | LaFave | B60R 9/10 |
| 9,707,811 | B2 * | 7/2017 | Columbia | B60D 1/07 |
| 9,745,006 | B2 * | 8/2017 | Pemberton | B60R 9/06 |
| 9,758,003 | B2 * | 9/2017 | Vernersson | B60D 1/145 |
| 10,220,661 | B1 * | 3/2019 | Gebheim | B60D 1/363 |
| 2002/0008364 | A1 * | 1/2002 | Kahlstorf | B60D 1/075 280/515 |
| 2007/0262108 | A1 * | 11/2007 | Columbia | B60R 9/06 224/519 |
| 2010/0200822 | A1 * | 8/2010 | Kitchens, Sr. | B66C 23/44 254/326 |
| 2010/0294819 | A1 * | 11/2010 | Spera | B60R 9/06 224/519 |
| 2016/0031377 | A1 * | 2/2016 | Pemberton | B60R 9/06 224/519 |

\* cited by examiner

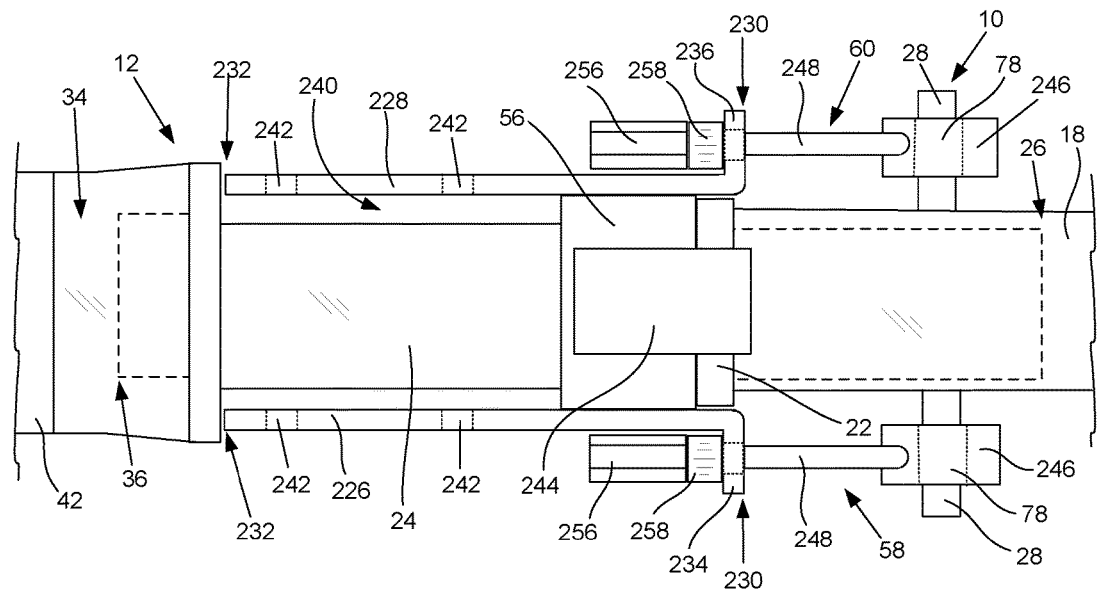
FIG. 28
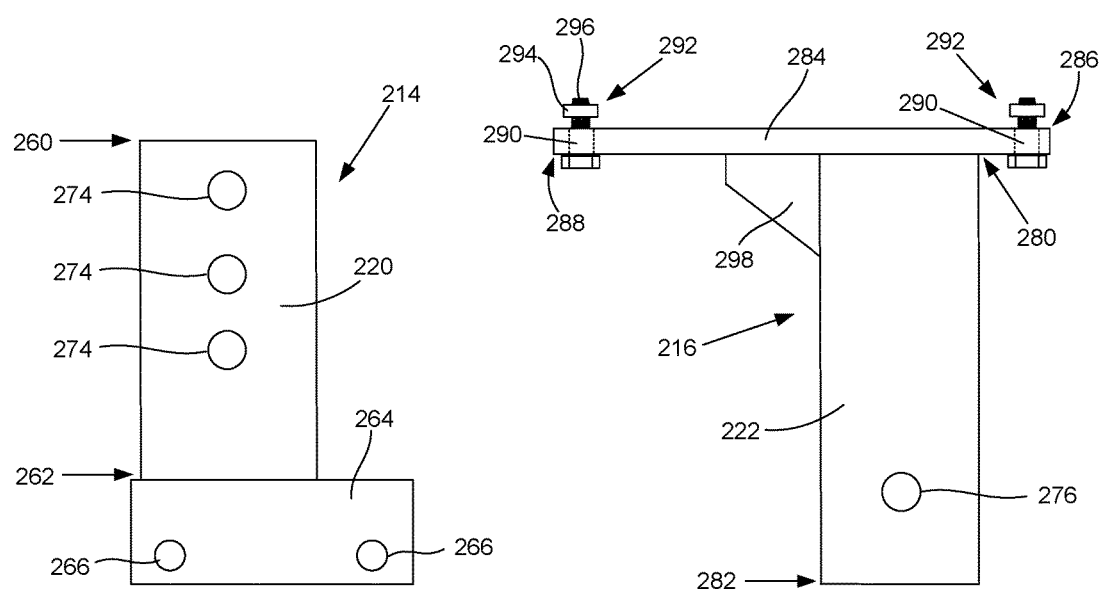
FIG. 29
FIG. 30

ASSEMBLY AND ADAPTER FOR SUPPORTING AN APPARATUS ON A VEHICLE TOW HITCH ASSEMBLY

BACKGROUND OF THE INVENTION

A. Field of the Invention

The present invention relates generally to devices for supporting an apparatus on a tow hitch assembly that is associated with a vehicle. In particular, the present invention relates to such devices that are removably mounted to the tow hitch assembly so an apparatus may be supportedly carried by the vehicle. Even more particularly, this invention relates to such devices that are configured to support a wide variety of different types of apparatuses which are utilized for a variety of different carrying and support purposes without interfering with the use of the tow hitch assembly for towing purposes.

B. Background

As generally well known, many people utilize a vehicle to transport a wide variety of items from one place to another. Although some of these items may be carried inside the vehicle, many items that are desired to be transported with a vehicle, such as bicycles, skis, ladders, cargo boxes, large tool boxes and the like, do not fit and/or are not easily placed within the relatively small interior space of a typical vehicle. Even if an item can fit inside the passenger area of the vehicle, placement of a larger-sized item in the vehicle is likely to result in limited space being remaining available for passengers to be in the vehicle. For some items, such as extra gasoline, fuel for camping stoves, open cans of paint or thinner and the like, it is generally not safe or otherwise desirable to carry the smelly and/or potentially explosive material inside the passenger area of the vehicle. In addition, placement of some items inside the vehicle, such as large tool or cargo boxes, substantially reduces the user being able to conveniently access the item to retrieve tools or other components therefrom when he or she is outside the vehicle.

Some vehicles have a roof rack that allows the user to place items, even relatively large items, on the roof of the vehicle or they have an integral trunk or bed area which allows larger items to be carried by the vehicle. Although the roof, trunk and bed areas of the vehicle generally allow transport of larger items than the interior space of the vehicle, they have certain drawbacks that limit the functionality of these areas for carrying certain items, such as large tool boxes, lawnmowers, mobility carts and the like. For instance, placement of items on the roof of the vehicle can be very difficult or even impractical for items that are heavy and/or awkwardly shaped. If not handled properly, such items can be dangerous for the person(s) placing the item on the roof of the vehicle and/or when removing the item from the vehicle roof. In addition, an item placed on the roof of a vehicle is subject to greater wind force as the vehicle moves along the road, generally requiring the item to be somewhat more secured than if carried elsewhere on the vehicle. In addition, placement of an item, particularly larger items, on the roof of the vehicle is likely to reduce the gas mileage efficiency of the vehicle. Although items carried in the trunk are generally more secure, most vehicle trunks are somewhat limited in size and/or have trunk openings that are configured such that it is not easy to place larger items in the trunk. For instance, skis, bicycles, ladders and the like generally do not fit in the trunk of a vehicle. For vehicles having a bed, such as a pickup truck, the bed provides significantly more carrying space and is generally easier access than the vehicle roof or trunk. However, any item placed in the bed of a vehicle must be well secured to prevent the item from sliding about the bed when the vehicle is moving to prevent the item from damaging the vehicle and/or itself. In addition, an item placed in the forward area of the bed of a truck is generally difficult to reach for convenient access to the item. An item placed at or near the rear area of a vehicle bed will generally allow more convenient access to the item, however, the item will then tend to block convenient access to the remaining portion of the bed.

Many vehicles are equipped with a tow hitch assembly, which is also referred to as a trailer hitch assembly, that is mounted to the vehicle at or near the center rear of the vehicle generally on the lower frame portion of the vehicle. As well known in the art, a common tow hitch assembly comprises a tube-shaped receiver that is fixedly mounted to the vehicle with a tube opening facing rearward of the vehicle, a receiver collar around the rearwardly facing tube opening, a hitch shaft having a first or forward end that is received in the receiver through the tube opening at the receiver collar, a pin, bolt or other locking device that is received through cooperatively positioned apertures in the receiver and hitch shaft to securely, but removably, connect the receiver to the hitch shaft, a hitch ball mounting plate at the second or rearward end of the hitch shaft and a hitch ball mounted to the mounting plate. The rearward facing tube opening is sized and configured to removably receive the hitch shaft into the receiver when the user needs to utilize the tow hitch assembly to tow a towable vehicle, such as a cargo trailer, recreational trailer, camper trailer, boat trailer and the like. In one common configuration, the tube opening is generally square with 2" interior sides (which is a common configuration for Class III, IV and V hitches). The opening generally has 1¼" interior sides for Class I and II hitches. The hitch ball is sized and configured, typically having a round shape with a 1¼" to 2½" diameter, depending on the Class rating of the tow hitch assembly, to removably connect the tow hitch to a towable vehicle. Commonly, a safety chain is utilized as a back-up safety mechanism to interconnect the vehicle tow hitch to the towable vehicle while the towable vehicle is being towed. Although the above describes a common type of tow hitch assembly, those who are skilled in the art will readily appreciate that there are a variety of different configurations of tow hitch assemblies that are currently in use.

To assist the owner or operator of a vehicle with carrying some of the items described above, including bicycles, tool boxes, mobility carts and extra fuel, a number of rack or platform devices are available that releasably connect to the receiver portion of the tow hitch assembly so as to be supported thereby and transported by the vehicle. Typically, such racks, platforms or the like have a shaft member that is sized and configured to be removably received inside the receiver, through the tube opening, and secured thereto with the locking device (typically an elongated pin or bolt) that is normally used to secure the hitch shaft to the vehicle receiver. In a common configuration, the rack, platform or other apparatus is integral with or attached to the shaft member so the apparatus can be supportedly carried by the receiver. Rack systems that are specifically sized and configured to carry one or more bicycles are sold by Thule, Yakima, Saris and others. Bicycle and other receiver rack systems are generally useful for carrying a variety of items, depending on the item and the configuration of the rack system, and do solve some of the problems described above with regard to carrying certain items on the roof or in the trunk or bed of the vehicle. However, utilizing the vehicle's tubular hitch receiver to receive the shaft member of the rack, platform or other apparatus in order to secure the rack to the vehicle has the disadvantage of eliminating the ability to use the tow hitch assembly for its intended purpose, namely to tow a towable vehicle (such as a trailer or boat).

As generally well known, many people desire to be able to carry items on a rack that is supported by the receiver at the back of the vehicle and to also utilize a tow hitch assembly to tow a towable vehicle. A few rack systems do provide a secondary receiver associated with the rack that faces rearward from the rack which allows the user to tow a towable vehicle. There are also receiver extensions that are utilized to provide a secondary receiver. Unfortunately, use of the extension leads to a longer, sometimes significantly longer, lever arm, which reduces the tongue capacity available for towing a towable vehicle. In addition, many of the available secondary receiver systems are configured such that user has to be careful what items are placed on the rack, platform or other apparatus being carried by the vehicle's receiver and how those items are placed so the items will not interfere with or otherwise be contacted by the towed vehicle during turns. As will be readily appreciated by persons skilled in the art, such contact can damage the towed vehicle and/or the items being carried.

What is needed, therefore, is an improved device for supporting an apparatus, such as a rack, platform or the like, on a vehicle tow hitch assembly in a manner that does not diminish or prevent use of the tow hitch assembly to tow a towable vehicle. Such a device should be configured to allow the vehicle to concurrently transport items on the apparatus and to tow a towable vehicle with the tow hitch assembly. Preferably, the device should be configured to support the apparatus so the item or items being carried thereby will not interfere with the normal use of the tow hitch assembly, namely towing a towable vehicle, and without reducing the towing capacity of the tow hitch assembly or result in any contact between the towable vehicle and the item being carried. The preferred device should be configured to be able to supportedly carry a wide variety of different types of useful apparatuses that are each configured to support one or more different types of items and/or to perform a function that is useful for the user. Preferably, such a device should be easy to use and at least somewhat economical to manufacture.

SUMMARY OF THE INVENTION

The adapter for supporting an apparatus on a vehicle tow hitch assembly of the present invention provides the benefits and solves the problems identified above. That is to say, the present invention discloses an adapter that attaches to a vehicle tow hitch assembly to support an apparatus on the tow hitch assembly so the apparatus and one or more items that are attached to or supported on the apparatus can be transported by the vehicle. The adapter of the present invention is configured to support the apparatus, which may be a rack, platform, gate or the like, on a tow hitch assembly of a vehicle in a manner that does not interfere with the use of the tow hitch assembly to tow a towable vehicle, such as a trailer, boat or the like. Unlike adapters that are presently in use, which are supported, secured and stabilized by utilizing the interior of the receiver tube and, therefore, interfere with the intended use of the tow hitch assembly, the adapter of the present invention is supported, secured and stabilized by engaging the exterior surfaces of the tow hitch assembly, thereby leaving the intended use of the receiver uncompromised. The new adapter allows use of a vehicle's tow hitch assembly to support an apparatus to accomplish one or more tasks, such a rack to transport bikes, cargo carriers, spare tires, gas cans, tool boxes and the like, an apparatus that is beneficially utilized with the vehicle, such as a pivoting gate assembly and the like, and an apparatus which supports an item that can be used at the vehicle destination, such as a ladder, table and the like.

The adapter of the present invention is configured to supportedly carry a wide variety of different types of apparatuses on the tow hitch assembly of a vehicle in a manner that allows the apparatus to support one or more items in the space between the vehicle and the vehicle being towed without diminishing or preventing use of the tow hitch assembly to tow the towable vehicle. Specifically, the new adapter of the present invention is structured and arranged such that when the adapter is attached to a vehicle's tow hitch assembly with an apparatus supported thereby, any items that are carried by the apparatus will not contact or be contacted by a towable vehicle connected to the tow hitch assembly while being towed, particularly when making a turn. In one embodiment, the new adapter is configured to provide a second receiver-like tube opening that is sized and configured to receive a hitch shaft component of an apparatus that is utilized to transport items with the vehicle. In the preferred configurations of the present invention, the new adapter is easy to attach to a tow hitch assembly and relatively economical to manufacture.

In one embodiment of the present invention, the adapter generally comprises an adapter collar, a pair of arms attached to or integral with the adapter collar and a locking device that is utilized to secure the adapter to a tow hitch assembly having a hitch shaft removably received in a receiver attached to a vehicle. The adapter collar has a collar opening disposed through the adapter collar and one or more outer sides facing outward from the adapter collar. The collar opening, which is typically centered in the adapter collar, is defined by one or more interior sidewalls that are sized and configured so the adapter collar can be received on and in close conformance with the tow hitch assembly without interfering with the ability of the hitch shaft to be removably received in the receiver. The pair of arms, which are disposed in spaced apart relation to each other such that they pass over and past the exterior sides of the receiver collar, are positioned on the adapter collar so as to extend generally parallel to the receiver and hitch shaft when the adapter is received on the tow hitch assembly. Each of the pair of arms has a proximal end located at the adapter collar and a distal end that extends forwardly from the adapter collar. Each of the pair of arms also has an arm aperture that is disposed generally toward the distal end thereof. The arm apertures are positioned on the arms so they are aligned in corresponding relation to a pair of receiver apertures that are located on the receiver and to a pair of hitch apertures that are located on the hitch shaft when the adapter is received on the tow hitch assembly. The locking device is sized and configured to be received through each of the arm apertures of the pair of arms and through each of the receiver apertures and the hitch apertures of the tow hitch assembly. A locking mechanism, such as a pin or the like, locks the locking device in place to prevent unintentional separation of the adapter from the tow hitch assembly. An apparatus is attached to or integral with at least one, typically a plurality, of the outer sides of the adapter collar and/or the pair of arms. When the adapter and apparatus are securely attached to the tow hitch assembly, the vehicle may be utilized to transport the apparatus and any items that are attached to or carried by the apparatus.

In one embodiment, the interior sidewalls of the collar opening are dimensioned in corresponding relation to the hitch shaft so as to be in close conformance with and engage the hitch shaft. In another embodiment, the interior sidewalls of the collar opening are dimensioned in corresponding relation to a receiver collar, which is typically located at or near the tube opening of the receiver, so as to tightly fit on and engage the exterior surfaces of the receiver collar. In either embodiment, each of the pair of arms are sufficiently spaced apart on the adapter collar to extend over and past the receiver collar. In yet another alternative embodiment, the bottom side of the adapter collar has a gap, which may be defined by a slot, that is sized and configured to receive and engage a gusset that is located at or near a second end of the hitch shaft to allow use of the adapter with such hitch shafts. The adapter can include a bottom extension member extending generally forward from the adapter collar over the receiver that has an engaging mechanism associated therewith for engaging the receiver so as to level the adapter and/or lock the adapter to the hitch assembly. The engaging mechanism can comprise one or more engaging devices, such as a set screw, that extends through the bottom extension member and to engage a bottom surface of the receiver. The apparatus can be a bicycle rack having a first frame member that extends generally upward from the adapter to connect with other bicycle frame members to support one or more bicycles thereon. Alternatively, the apparatus can be a carrier apparatus that is configured to carry one or more items thereon. In a preferred embodiment, the carrier apparatus comprises a pair of elongated primary support arms that extend outwardly in opposite directions from the adapter, a carrier arm extending outwardly from each of the primary support arms and a vertical section extending upward from a distal end of each of the carrier arms. Preferably, each carrier arm is telescopically connected to its respective primary support arm to allow the user to adjust the width of the carrier apparatus to correspond with the width of the vehicle. In one embodiment, the item carried by the carrier apparatus is a gate assembly that is pivotally attached to an upper end of one of or each of the vertical sections. If desired, the gate assembly can be configured to support one or more secondary items thereon, such as a tire mount, a storage bin, a bicycle rack and/or a tool box. Various other apparatuses can attach to the adapter of the present invention and many different types of items can be carried by the apparatus to be transported by the vehicle.

In the primary embodiment of the present invention, each of the pair of arms has a proximal end that is located at the adapter collar and a distal end that extends forwardly from the adapter collar. Each of the pair of arms has a connecting mechanism at or near the proximal ends thereof that is structured and arranged to adjustably align a pair of locking apertures with a pair of receiver apertures that are located on the receiver and to a pair of hitch apertures that are located on the hitch shaft when the adapter is removably received on the tow hitch assembly. The locking device is sized and configured to be received through each of the locking apertures of the connecting mechanism and through each of the receiver apertures and the hitch apertures of the tow hitch assembly. A locking mechanism, such as a pin or the like, locks the locking device in place to prevent unintentional separation of the adapter from the tow hitch assembly. An apparatus that can be utilized to carry one or more items is attached to or integral with the pair of arms.

In one embodiment, the new apparatus support assembly comprises a component tube and a second receiver. The component tube has a lower end that is attached to or integral with the tow hitch assembly and an upper end which is upwardly disposed above the tow hitch assembly. The second receiver is attached to or integral with the component tube. The second receiver has a first end and a second end, with at least one of a forward facing opening at the first end of the second receiver and a rearward facing opening at the second end of the second receiver. Each of the forward facing opening and the rearward facing opening are sized and configured to receive a support shaft of the apparatus so as to support the apparatus on the tow hitch assembly without interfering with the ability of the hitch shaft to be received in the tube opening of the receiver in order to allow the tow hitch assembly to be utilized to support the apparatus while simultaneously towing a towable vehicle with the vehicle. In one configuration, the second receiver is moveably attached to the component tube so as to be able to move forwardly and rearwardly relative to the vehicle in order to allow the user to beneficially position the apparatus in a carrying space between the vehicle and the towable vehicle. The second receiver can be slidably attached to the component tube. In another configuration, the second receiver is mounted to an elongated channel member that is attached to or integral with the component tube. The channel member has a forward end and a rearward end, with the second receiver and the channel member being cooperatively configured to moveably position the second receiver between the forward end and the rearward end of the channel member. The channel member can be slidably mounted to a cooperatively configured component shaft assembly that is attached to or integral with the component tube. In one configuration, the component shaft assembly comprises a component shaft that is received in the component tube through the upper end thereof so as to support the channel member and the second receiver above the component tube. The component tube and the component shaft can be cooperatively configured so the component shaft is moveably disposed in the component tube to adjust the height of the second receiver relative to the tow hitch assembly.

In one of the preferred embodiments, the support assembly has an adapter between the component tube and the tow hitch assembly, with the adapter being structured and arranged to be mounted on the tow hitch assembly and to support the second receiver above the tow hitch assembly in a manner that does not interfere with use of the tube opening to receive the hitch shaft and the vehicle to tow the towable vehicle. In one configuration, the component tube is pivotally attached to the adapter to move the component tube between an upwardly disposed position and a rearwardly disposed position so as to tilt the apparatus and any items supported by the apparatus rearwardly away from the vehicle when the apparatus is mounted to the second receiver and the adapter is mounted on the tow hitch assembly.

A variety of adapters can be utilized with the new support assembly of the present invention. In one of the preferred embodiments, the adapter comprises: (a) an adapter collar defining a collar opening sized and configured to be received on and engage the tow hitch assembly without interfering with the ability of the hitch shaft to be received in the tube opening of the receiver, the adapter collar sized and configured to be placed in abutting relation with a collar of the receiver so as to align the collar opening with the tube opening; (b) a first side member attached to or integral with a first side of the adapter collar and positioned so as to extend generally parallel to the receiver and to the hitch shaft when the adapter is received on the tow hitch assembly, the first side member having a first end extending forward of the adapter collar and a second end extending rearward from the adapter collar, the first side member having a first outwardly projecting flange at the first end thereof; (c) an elongated first arm associated with the first side member, the first arm having a first end and a second end, the second end of the first arm in engaging relation with the first flange so as to dispose the first end thereof forwardly from the first flange, the first arm having an arm aperture at or near the first end thereof; (d) a second side member attached to or integral with a second side of the adapter collar and positioned so as to extend generally parallel to the receiver and to the hitch shaft when the adapter is received on the tow hitch assembly, the second side member having a first end extending forward of the adapter collar and a second end extending rearward from the adapter collar, the second side member having a second outwardly projecting flange at the second end thereof; and (e) an elongated second arm associated with the second side member, the second arm having a first end and a second end, the second end of the second arm in engaging relation with the second flange so as to dispose the first end thereof forwardly from the second flange, the second arm having an arm aperture at or near the first end thereof. The first side member and the second side member are cooperatively sized and configured with the adapter collar so the collar of the receiver will be disposed between the first side member and the second side member when the adapter collar is in abutting relation with the collar of the receiver and the arm apertures of the first arm and the second arm will be aligned in corresponding relation with a pair of cooperatively positioned receiver apertures in the receiver and a pair of cooperatively positioned hitch apertures in the hitch shaft so an elongated locking device can be received through each of the arm apertures, the receiver apertures and the hitch apertures to removably secure the adapter to the tow hitch assembly to allow transport of the apparatus by the vehicle when the adapter is placed on the tow hitch assembly with the hitch shaft received in the tube opening of the receiver.

In one embodiment, each of the first arm and the second arm are structured and arranged to be adjustable in length so as to selectively position the first side member and the second side member forwardly or rearwardly relative to the vehicle. In another configuration, the adapter collar is defined by a first collar member and a second collar member, the first collar member and the second collar member positioned in spaced apart relation so as to receive the hitch shaft therebetween when the adapter is mounted on the tow hitch assembly. In another configuration of the support assembly, a component base is disposed between and interconnects the component tube and the adapter, with the component base being structured and arranged to attach the component tube to each of the first side member and the second side member of the adapter.

Accordingly, the primary aspect of the present invention is to provide an adapter for supporting an apparatus on a tow hitch assembly of a vehicle that has the advantages discussed above and which overcomes the disadvantages and limitations associated with prior art adapters for tow hitch assemblies that are utilized to carry such apparatuses.

It is an important aspect of the present invention to provide an adapter for a vehicle tow hitch assembly that allows use of the tow hitch assembly to carry various apparatuses without interfering with the normal use of the tow hitch assembly to tow a towable vehicle, such as a trailer or the like, behind the vehicle having the tow hitch assembly.

It is an important aspect of the present invention to provide an adapter for a vehicle tow hitch assembly that is supported, secured and stabilized by engagement with the exterior surfaces of the tow hitch assembly rather than the interior of the receiver tube, as is the situation with prior art adapters.

It is an important aspect of the present invention to provide an adapter for removably supporting an apparatus on a vehicle tow hitch assembly that is configured to securely fit on and be carried by the tow hitch assembly so the apparatus can be utilized to transport items by the vehicle and/or be utilized with the vehicle to provide a useful function for the users of the vehicle, such as being able to carry bicycles, toolboxes, cargo carriers and other items and/or to provide a gate enclosure, rack or the like.

It is also an important aspect of the present invention to provide an adapter for supporting an apparatus on a vehicle's tow hitch assembly, with the adapter comprising, in one embodiment, an adapter collar and a pair of arms that extend forward from the collar, with the collar having a collar opening that is sized and configured to be received on and engage either the hitch shaft or the receiver collar of the tow hitch assembly and the arms being connected to the receiver of the tow hitch assembly when the hitch shaft is removably received in the receiver of the tow hitch assembly.

It is also an important aspect of the present invention to provide an adapter for supporting an apparatus on a vehicle's tow hitch assembly, with the adapter comprising, in one embodiment, an adapter collar, a pair of arms that extend forward from the collar and a connecting mechanism that connects the adapter to the receiver of the tow hitch assembly, with the collar having a collar opening that is sized and configured to be received on and engage the tow hitch assembly and the connecting mechanism being configured to adjust in length to securely connect the arms of the adapter to the receiver of the tow hitch assembly when the hitch shaft is removably received in the receiver of the tow hitch assembly.

Another important aspect of the present invention is to provide an adapter for supporting an apparatus on a vehicle's tow hitch assembly that is configured to attach to or be integral with a wide variety of different types of items that can be carried by or used with the vehicle.

Another important aspect of the present invention is to provide an adapter for supporting an apparatus on a vehicle's tow hitch assembly that, in some embodiments, is structured and arranged to provide a second tubular receiver-like member having a tube opening which can removably receive a shaft of another apparatus that can be used to carry items with the vehicle.

Another important aspect of the present invention is to provide an adapter for supporting a receiver apparatus on a vehicle's tow hitch assembly that provides a second tubular receiver-like member having a tube opening or openings which can removably receive a shaft of another apparatus that can be used to carry items with the vehicle, with both the adapter and receiver apparatus being adjustably configured to allow the adapter to be utilized with different sizes and configurations of tow hitch assemblies and with different vehicle contours and the receiver apparatus to be positioned so items carried by the second apparatus will not interfere with the use of the tow hitch assembly to tow a towable vehicle.

Another important aspect of the present invention is to provide an adapter for supporting an apparatus on a vehicle's tow hitch assembly having a hitch shaft that is removably received in a receiver, with the adapter and the attached apparatus being sized and configured for different configurations and sizes of tow hitch assemblies and for different vehicle contours.

As will be explained in greater detail by reference to the attached figures and the description of the preferred embodiments which follow, the above and other objects and aspects are accomplished or provided by the present invention. As set forth herein, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 28 is a top view of the adapter of FIG. 25 shown mounted on the tow hitch assembly of FIG. 2;

FIG. 29 is a right side view of the component tube assembly of FIG. 23 shown separate from the adapter, tow hitch assembly, component shaft assembly and second receiver assembly of FIG. 23;

FIG. 30 is a right side view of the component shaft assembly of FIG. 23 shown separate from the adapter, tow hitch assembly, component tube assembly and second receiver assembly of FIG. 23;

DETAILED DESCRIPTION OF THE PREFERRED EMBODIMENTS

Figure 1:
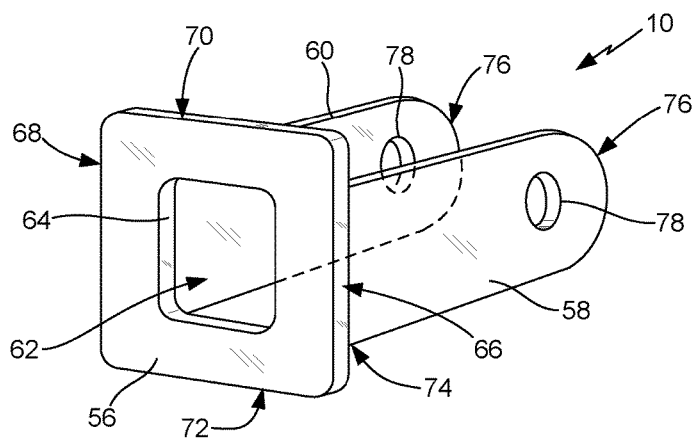
FIG. 1 is a right side perspective view of an adapter for supporting an apparatus on a vehicle tow hitch assembly configured according to a first embodiment of the present invention.
Figure 2:
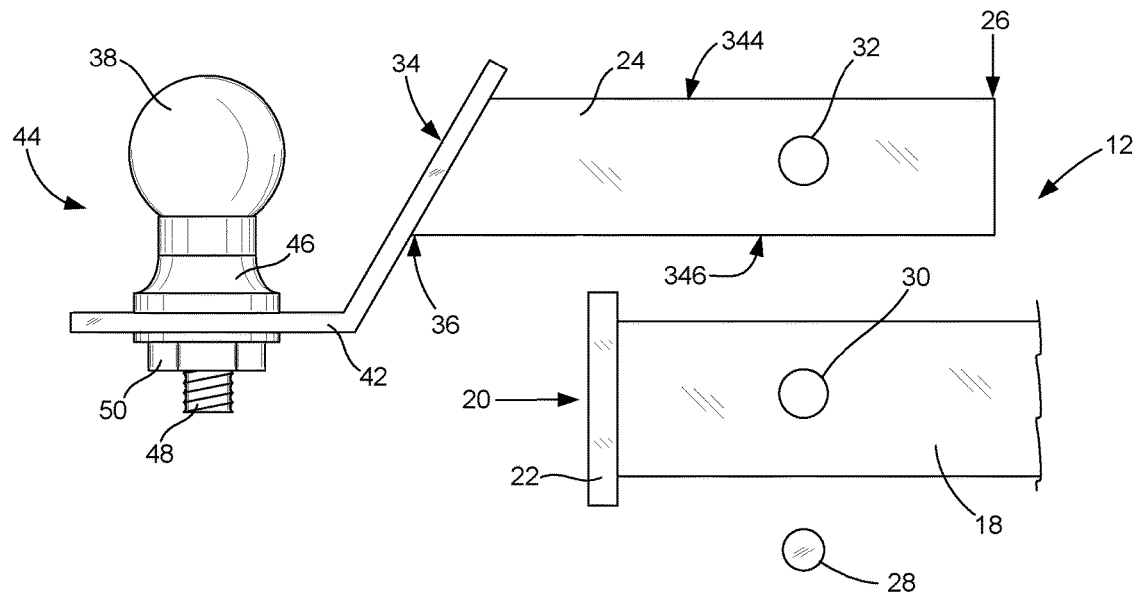
FIG. 2 is an exploded right side view of a prior art vehicle tow hitch assembly.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new adapter of the present invention, as well as the various examples of tow hitch assemblies and apparatuses with which the new adapter may be utilized, those skilled in the art will readily appreciate that the present invention is not so limited. In addition, the exemplary embodiments of the present adapter are shown and described herein with only those components that are required to disclose the present invention. As such, it may be possible that some of the necessary elements for attaching and using the present invention are not shown or necessarily described below, but which are well known to persons who are skilled in the relevant art. As will be readily appreciated by such persons, the elements of the present invention that are described below may take on any form consistent with forms that are readily realized by a person of ordinary skill in the art having knowledge of tow hitch assemblies and apparatuses that can be supported thereon.

An adapter that is configured pursuant to various embodiments of the present invention is shown generally as 10 in FIGS. 1-5, 7-16, 21-28 and 35-39. The adapter 10 is configured for use with a tow hitch assembly 12 that is attached to or otherwise associated with a vehicle 14, as best shown in FIGS. 2, 3, 5, 6, 10 and 16. In normal use, a tow hitch assembly 12 is configured to allow the user to tow a towable vehicle 16, such as the trailer shown in FIG. 5, behind the vehicle 14. The typical tow hitch assembly 12 is mounted to the vehicle 14 at or near the center of the rear of the vehicle 14, generally on the lower portion thereof, as best shown in FIG. 5. As well known, a common tow hitch assembly 12 comprises a tubular shaped receiver 18 that is fixedly mounted to the vehicle 14 with a tube opening 20 facing rearward of the vehicle 14, a receiver collar 22 disposed around the receiver 18 to define the rearwardly facing tube opening 20, a hitch shaft 24 having a first or forward end 26 that is slidably received in the receiver 18 through the tube opening 20 at the receiver collar 22, a locking device 28 (typically configured as a pin, bolt or the like) that is received through a pair of opposing receiver apertures 30 in the receiver 18 and a pair of opposing hitch apertures 32 in the hitch shaft 24 to connect receiver 18 to hitch shaft 24, a hitch ball mounting plate 34 at the second or rearward end 36 of the hitch shaft 24 and a hitch ball 38 mounted to the hitch ball mounting plate 34, as best shown in FIGS. 2, 3, 5, 6 and 10. The rearward facing tube opening 20 and hitch shaft 24 are cooperatively sized and configured so the hitch shaft 24 can be removably received in the receiver 18 when the user desires to utilize tow hitch assembly 12 to tow a towable vehicle 16, which can be a recreational trailer, cargo trailer, camper trailer, boat trailer or the like. The standard hitch ball 38 is sized and configured, typically having a round shape with a 1¼" to 2½" diameter, to removably engage a tow tongue 40 that connects the tow hitch 12 to a towable vehicle 16, as best shown in FIG. 5. Typically, the hitch ball 38 attaches to a generally horizontal portion 42 of the hitch ball mounting plate 34 utilizing a ball attachment assembly 44 comprising a base 46 having a threaded bolt 48 and nut 50 connecting element. A safety chain (not shown in the figures) is often utilized as a secondary or back-up safety device while the towable vehicle 16 is being towed by vehicle 14. Although the above describes a commonly configured tow hitch assembly 12, those skilled in the art will readily appreciate that a variety of different configurations of tow hitch assemblies are currently in use. As with the tow hitch assembly 12 described above, these other tow hitch assemblies are also generally suitable for use with adapter 10 of the present invention. As such, the present invention is not limited to the configurations of the tow hitch assembly 12 described herein and shown in the various figures included herewith.

For purposes of describing the present invention, the terms "front", "forward", "forwardly" and the like are utilized herein to reference as the object or an area of an object being in the direction toward the front end of the vehicle 14 (the direction the driver faces when he or she is driving the vehicle 14) and the terms "rear", "rearward", "rearwardly" and the like are utilized herein to reference as the object or an area of an object being in the direction toward the rear or back end of the vehicle 14. As such, a rearwardly facing component or area thereof (i.e., the rearward facing tube opening 20) faces in a direction away from the vehicle 14 to which the component is associated. For purposes of describing the present invention, the terms "up", "upward", "upper" and "top" refer to a direction that is opposite to or away from the ground, road, street or other surface on which the vehicle 14 moves and the terms "down", "downward", "lower", "bottom" and the like refer to a direction that is toward the ground, road, street or other surface on which the vehicle 14 moves. The use of these relative terms herein are well known to persons skilled in the related art and to those who are familiar with the use of tow hitch assemblies 12 on a vehicle 14.

As set forth in more detail below, the new adapter 10 of the present invention is configured to engage one or more components of tow hitch assembly 12 to support an apparatus 52 that can be utilized on its own with vehicle 14 and/or be utilized to carry one or more items 54 with the vehicle 14. Examples of apparatuses 52 and items 54 are set forth below and shown in FIGS. 5, 16, 23, 29-34 and 39. The useful apparatuses 52 and items 54 described below and shown in the referenced figures are included herein for exemplary purposes only. As will be readily appreciated by persons who are skilled in the art, the new adapter 10 can be utilized with a wide variety of apparatuses 52 and items 54 and, as such, the various examples that are included herein are not intended to limit the scope of the present invention.

A first embodiment of the new adapter 10 of the present invention is shown in FIGS. 1 through 5. In this embodiment, the adapter 10 comprises an adapter collar 56 and a pair of forwardly extending arms, namely first arm 58 and second arm 60, that are attached to or integral with the adapter collar 56 and extend towards the front of vehicle 14 when the adapter 10 is mounted on the tow hitch assembly 12 associated with vehicle 14. As explained in more detail below, the adapter collar 56 and/or forwardly extending arms 58/60 are configured to be attached to or integral with an apparatus 52 so the apparatus 52 may be supportedly carried by the tow hitch assembly 12 associated with a vehicle so the apparatus 52 may be utilized to carry one or more items 54 on the vehicle 14 and/or to accomplish other beneficial functions for the user with the vehicle 14 at the tow hitch assembly 12.

Figure 3:
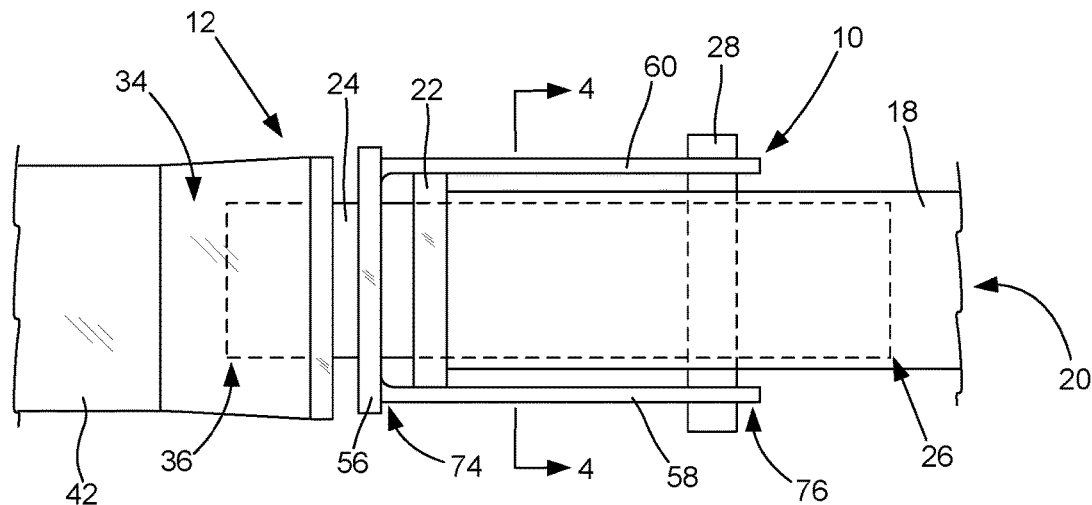
FIG. 3 is a top view of the adapter of FIG. 1 and the vehicle tow hitch assembly of FIG. 2 shown without the hitch ball of the tow hitch assembly.
Figure 4:
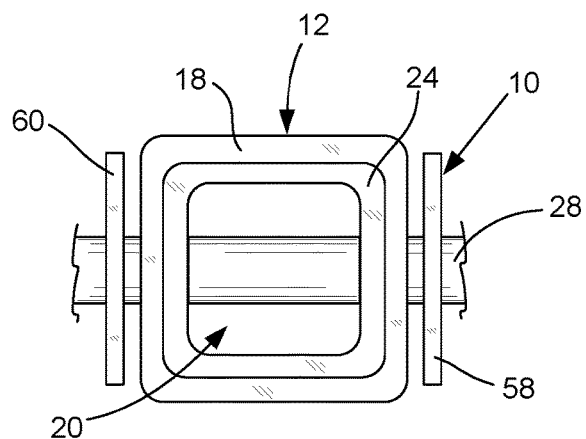
FIG. 4 is a cross-sectional view of the adapter and tow hitch assembly of FIG. 3 taken through lines 4-4 of FIG. 3 to illustrate the locking device interconnecting the adapter, receiver and hitch shaft.
Figure 5:
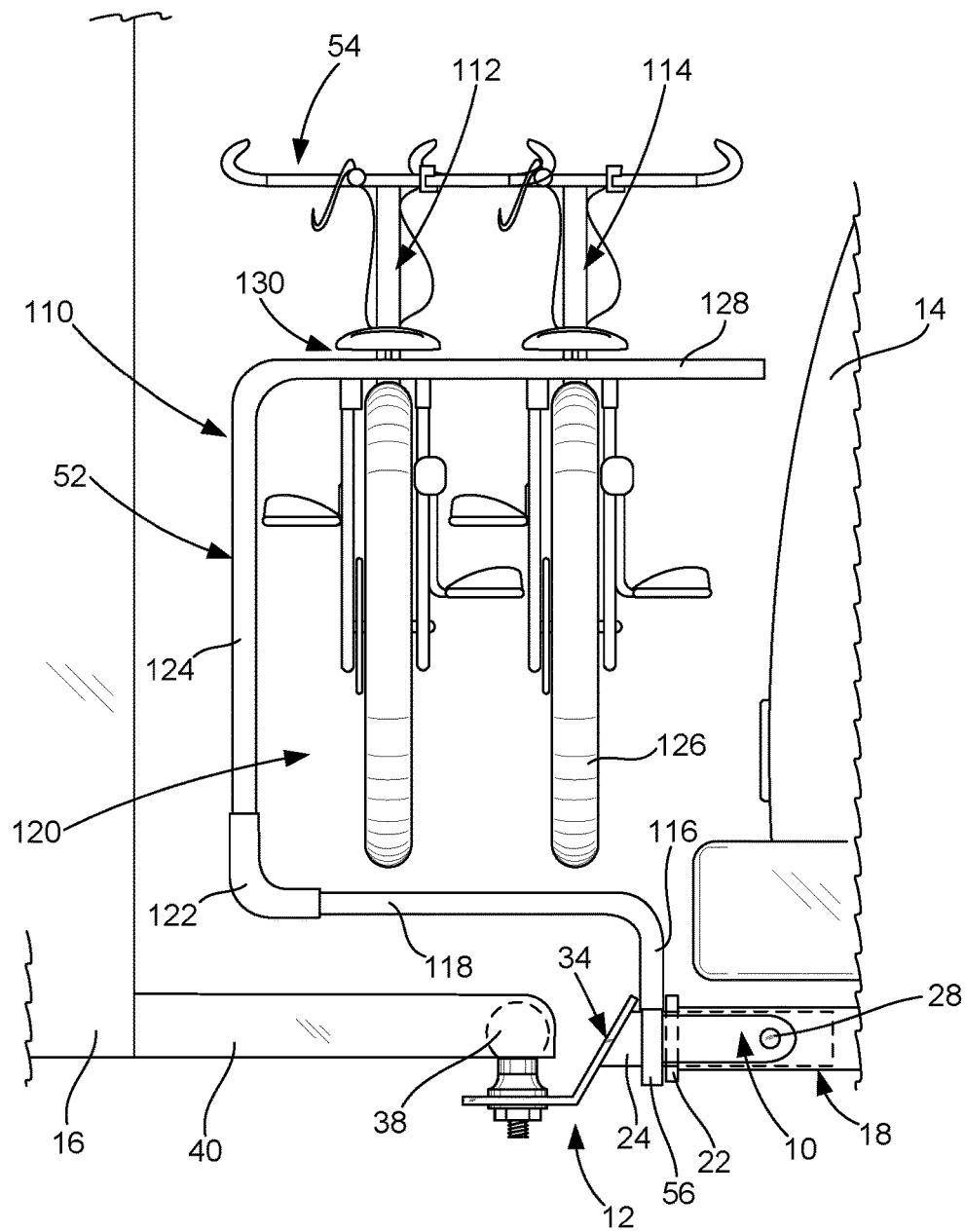
FIG. 5 is a right side view of the adapter and tow hitch assembly of FIG. 3 shown in use with an apparatus configured as a bicycle rack supporting two bicycles thereon.
Figure 6:
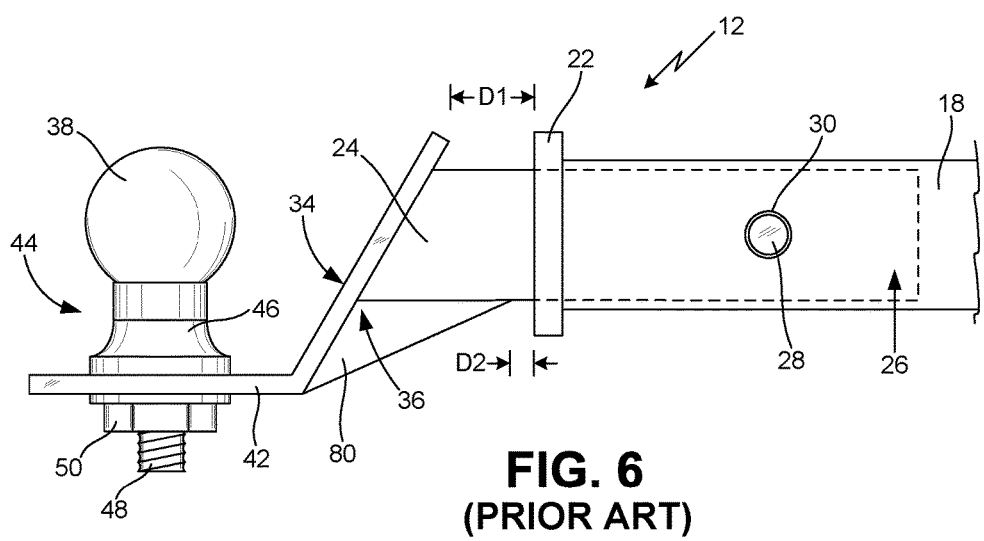
FIG. 6 is a right side view of a prior art hitch assembly having a reinforcement gusset on the lower side of the hitch shaft.
Figure 7:
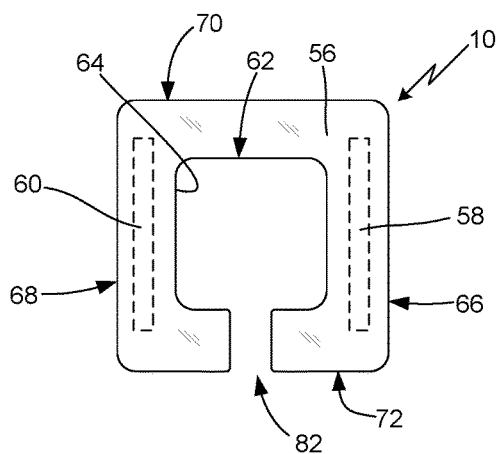
FIG. 7 is a back view of an alternative configuration of the adapter of FIG. 1 for use with the tow hitch assembly of FIG. 6.
Figure 8:
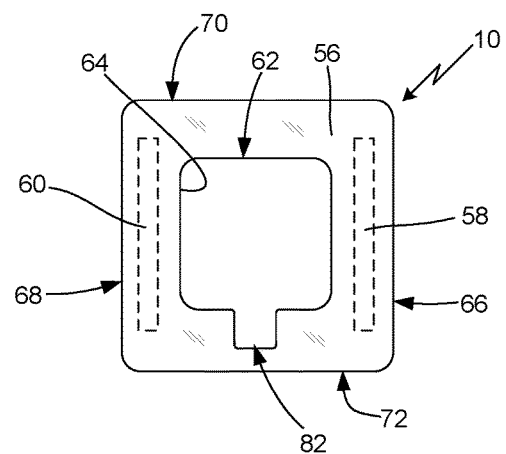
FIG. 8 is a back view of another alternative configuration of the adapter of FIG. 1 for use with the tow hitch assembly of FIG. 6.

The adapter collar 56 has a collar opening 62 with interior sidewalls 64 that are sized and configured to be in substantially corresponding relation to the outer dimensions of hitch shaft 24 and the collar opening 62 is positioned so as to be generally aligned with the tube opening 20 of receiver 18 when adapter 10 is in use with tow hitch assembly 12, as best shown in FIGS. 3-5. The collar opening 62 is sized and configured to be in close conformance with the outer dimensions of the hitch shaft 24, preferably with very little or no wobbling when adapter 10 is received onto hitch shaft 24. In the embodiment shown in the figures, collar opening 62 has a square shape that has dimensions which are substantially the same as the square shape of hitch shaft 24 (only very slightly larger so adapter collar 56 fits over the hitch shaft 24). Adapter collar 56 has a plurality of outer sides that attach to or are integral with apparatus 52 so as to support the useful apparatus 52 on tow hitch assembly 12. In the embodiment shown in the figures, adapter collar 56 has a first side 66, a second side 68 on the opposite side of the adapter collar 56, a top side 70 and a bottom side 72 on the opposite side of the adapter collar 56, as best shown in FIGS. 1 and 7-8. In one embodiment, the apparatus 52 will attach to or be integral with one or more of the outer sides 66, 68, 70 and 72 to be supported on the tow hitch assembly 12. Alternatively, the useful apparatus 52 will attach to or be integral with one or more of the forwardly extending arms 58/60 or to both the adapter collar 56 and one or more of arms 58/60. Often, at least two of the outer sides 66, 68, 70 and 72 and/or both arms 58/60 will attach to or be integral with apparatus 52 so as to provide sufficient connection between the adapter 10 and useful apparatus 52 to safely and effectively support the useful apparatus 52 on tow hitch assembly 12 associated with vehicle 14. Each of first arm 58 and second arm 60 has a first or proximal end 74 that is attached to or integral with the adapter collar 56, a second or distal end 76 that extends forwardly from and is in spaced relation to the adapter collar 56 and an arm aperture 78 generally positioned towards the second end 76 of the arms 58/60, as best shown in FIG. 1. As shown in the figures, in a preferred embodiment of the present invention, each of first arm 58 and second arm 60 extend generally parallel to the receiver 18 and the hitch shaft 24 when adapter 10 is positioned on hitch assembly 12, as best shown in FIGS. 3 and 4. The arms 58/60 have a length from first end 74 to second end 76 that is sufficient for the second end 76 to extend past the receiver apertures 30 of receiver 18 so the arm apertures 78 may be placed in aligned relationship with each of the receiver apertures 30 and hitch apertures 32 to allow the locking device 28 to be received through each of the receiver apertures 30, hitch apertures 32 and arm apertures 78 and interlock the receiver 18, hitch shaft 24 and arms 58/60 together to, in effect, form a single or unified component. Typically, a locking mechanism (not shown), such a cotter pin or other connector, goes through one or both ends of the locking device 28 to prevent the locking device 28 from falling out during movement of vehicle 14. As best shown in FIG. 3, when positioned for use on the tow hitch assembly 12, the arm apertures 78, receiver apertures 30 and hitch apertures 32 are aligned in corresponding relation. As with receiver apertures 30 and hitch apertures 32, the arm apertures 78 should be sized and configured to tightly receive the locking device 28 therethrough.

The tube opening 20 of receiver 18 and the outer dimensions of the hitch shaft 24 are provided in standard sizes. The collar opening 62 is sized and configured to fit over and be supported by the standard hitch shaft 24, providing a generally universal adapter 10 for supporting a useful apparatus 52. Being in close conformance with collar opening 62 on the hitch shaft 24 provides support in all directions, including rotational resistance. In a preferred embodiment, the standard locking device 28 is replaced with an improved locking device 28 that is made out of a high strength material and having a sufficient length to extend completely through the arms 58/60 of adapter 10 and through the receiver 18 and hitch shaft 24 (the adapter 10 is likely to require a slightly longer length for the locking device 28, depending on the thickness of arms 58/60). In one embodiment, the locking device 28 is a high strength bolt and nut with which the user can tighten the arms 58/60 against the collar 22 of the receiver 18 to provide additional resistance to rotation and bending, as shown in FIG. 3. One benefit of the configuration of adapter 10 shown in FIGS. 1 and 3-5 is that there will usually not be any interference with the mounting elements that are utilized to mount the receiver 18 to the vehicle 14 or from the safety chains that are often utilized when towing the towable vehicle 16. Although shown with certain shapes in the figures, the shape of adapter collar 56 and arms 58/60 can be varied from that shown. The adapter 10 will typically be manufactured from a metal such as steel, aluminum, stainless steel or other suitable alloys. If desired, certain composite materials may provide sufficient strength features to be utilized for adapter 10.

Alternative configurations of the embodiment of the new adapter 10 that is described above are shown in FIGS. 7 and 8. These configurations are particularly useful for prior art tow hitch assemblies 12 that have a reinforcing gusset 80 on the lower side of the hitch shaft 24 at or near the second end 36 thereof, as shown with regard to the prior art tow hitch assembly 12 in FIG. 6. The configuration of the adapter 10 shown in FIGS. 1 and 3-5 may not be able to fit with the space between the end of the gusset 80 and the collar 22 of receiver 16. In the typical configuration, the space available for placement of the adapter 10 is the distance between the top of the hitch mounting plate 34 and the collar 22, which distance is shown as D1 in FIG. 6. Because of the gusset 80, however, the space available for the placement of adapter 10 is shortened to the distance between the forward end of the gusset 80 and the collar 22, which distance is shown as D2 in FIG. 6. To allow the adapter 10 to universally fit into the space available and accommodate gusset 80, the adapter collar 56 is provided with a gap 82 through the bottom side 72 thereof that is sized to receive the gusset 80 therein. In FIG. 7, the gap 82 extends all the way through the lower wall of adapter collar 56 (i.e., from the inner sidewall 64 to the bottom side 72 of adapter collar 56). The ends of the adapter 10 at the gap 82 should abut or nearly abut gusset 80 (as shown) to provide the desired stability for adapter 10 to resist bending and rotational forces that result from the weight and movement of the apparatus 52 and the one or more items 54 that are carried by the apparatus 52. The downward forces on the adapter 10 during use thereof to support apparatus 52 and items 54 should be such as to keep the ends of the adapter 10 at the gap from spreading apart. In FIG. 8, gap 82 is defined by a slot in the lower wall of adapter collar 56. As shown, the gap 82 defined by the slot does not extend all the way through to the bottom side 72 of adapter collar 56. Because the adapter collar 56 is continuous on all four sides, the slotted opening defining the gap 82 avoids the possibility that the gap 82 could spread apart and then tend to swing, which may be possible with the gap 82 of FIG. 7, when useful apparatus 52 is supported by adapter 10, particularly if one or more heavy items 54 are supported by apparatus 52 and the items tend to move independent of the apparatus 53 or cause apparatus 52 to pivot.

Figure 9:
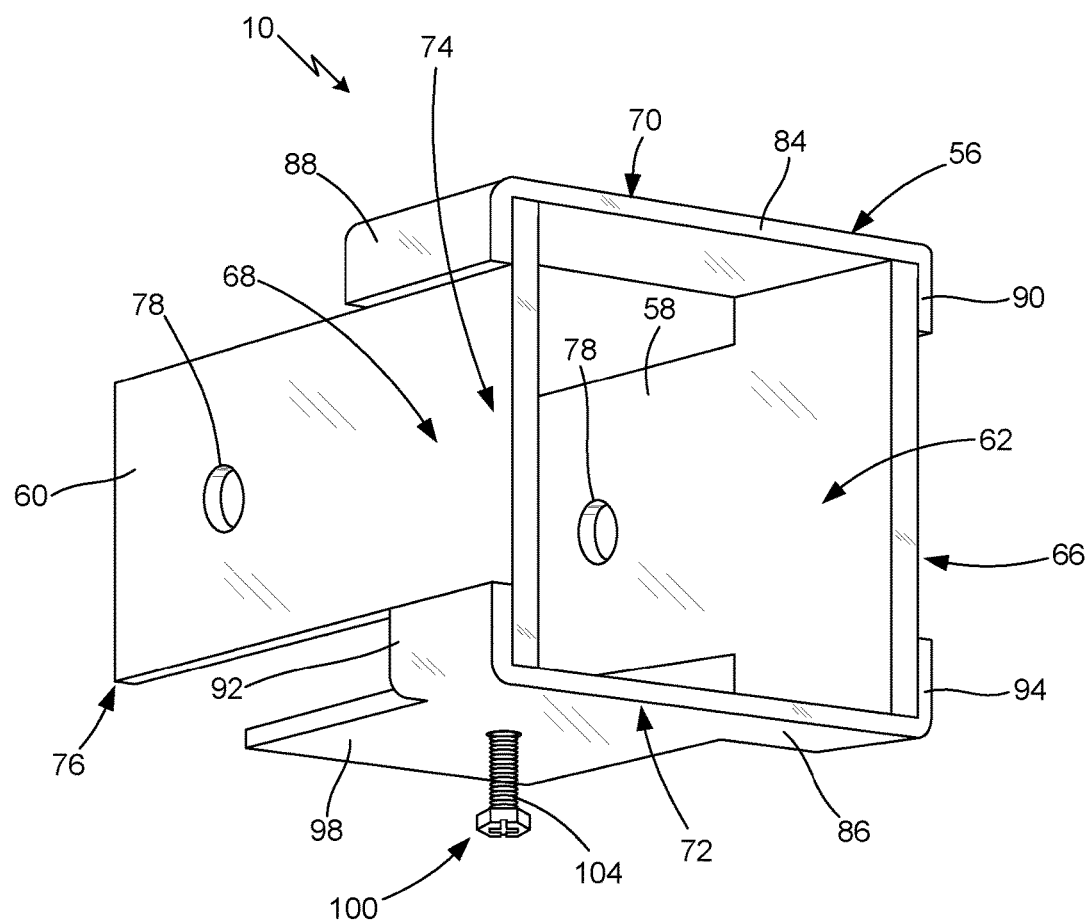
FIG. 9 is a left side perspective view of an adapter for supporting an apparatus on a vehicle tow hitch assembly configured according to a second embodiment of the present invention.
Figure 10:
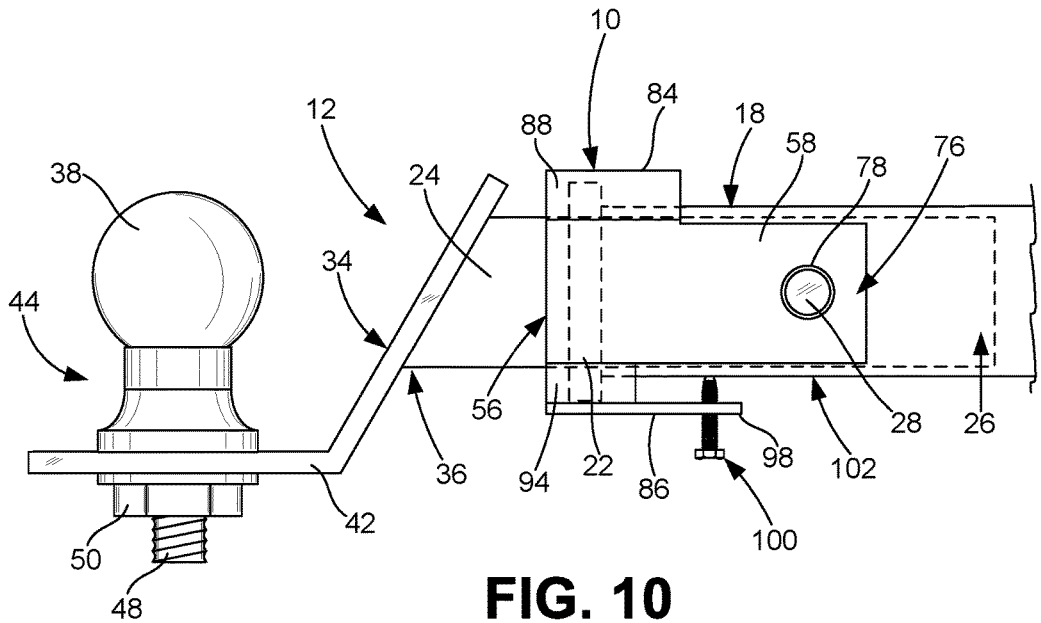
FIG. 10 is a right side view of the adapter of FIG. 9 shown on a tow hitch assembly.
Figure 11:
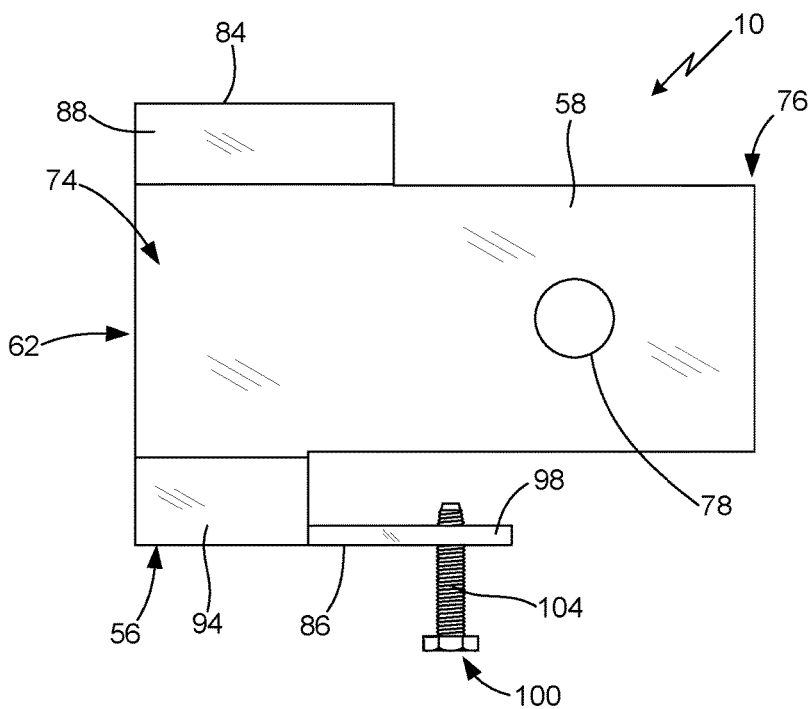
FIG. 11 is a right side view of the adapter of FIG. 9.

A second embodiment of the adapter 10 of the present invention is shown in FIGS. 9 through 15. As with the above embodiment, the adapter 10 of the second embodiment is supported by the tow hitch assembly 12 and adaptable for attachment to or being integrally formed with apparatus 52 so the apparatus 52 may be utilized with the vehicle 14 by itself or to enable the vehicle 14 to carry one or more items 54. In this embodiment, the adapter collar 56 is sized and configured to be in corresponding relation to the exterior dimensions of the collar 22 of the receiver 18, as opposed to the exterior dimensions of the hitch shaft 24 in the first embodiment. As best shown in FIG. 10, the adapter collar 56 of this embodiment is sized and configured to fit over and in close conformance with the receiver collar 22, preferably with very little or no wobbling when the adapter 10 is received onto the receiver collar 22. In the embodiment shown in the figures, the collar opening 62 has a square or generally shape that has dimensions which are substantially the same as the square shape of the receiver collar 22 (only very slightly larger so adapter collar 56 fits over receiver collar 22) such that the receiver collar 22 provides support for the adapter 10. As with the above embodiment, the adapter collar 56 of this embodiment has a pair of forwardly extending arms 58/60 as well as a plurality of outer sides 66/68/70/72 that attach to or are integral with the apparatus 52 so as to support apparatus 52 on the tow hitch assembly 12. In the embodiment shown in the FIGS. 9-15, the adapter collar 56 has a generally square shape with a first side 66, a second side 68 on the opposite side of adapter collar 56, a top side 70 and a bottom side 72 on the opposite side of the adapter collar 56. Often, two or more of the outer sides 66, 68, 70 and 72 and/or one or more of the arms 58/60 will attach to or be integral with the apparatus 52 so as to provide sufficient connection between the adapter 10 and the apparatus 52 to safely and effectively support the apparatus 52 on tow hitch assembly 12 associated with vehicle 14. As above, each of the first arm 58 and second arm 60 has a first or proximal end 74 that is attached to or integral with (as shown) the adapter collar 56, a second or distal end 76 that extends forwardly from and is in spaced relation to the adapter collar 56 and an arm aperture 78 generally positioned towards the second end 76 of arms 58/60, as best shown in FIGS. 9-11. As shown in the figures, the first arm 58 and second arm 60 extend generally parallel to receiver 18 and hitch shaft 24 when the adapter 10 is positioned on hitch assembly 12. The arms 58/60 have a length from first end 74 to second end 76 that is sufficient for second end 76 to extend past the receiver apertures 30 of receiver 18 so the arm apertures 78 may be placed in aligned relationship with the receiver apertures 30 and hitch apertures 32 so the locking device 28 may be received through each of the arm apertures 78, receiver apertures 30 and hitch apertures 32 to interlock these components together to essentially form a single or unified unit. A locking mechanism, such as a cotter pin or other connector, goes through one or both ends of the locking device 28 to prevent the locking device 28 from falling out during movement of the vehicle 14. When positioned on receiver collar 22 for use with the tow hitch assembly 12 and vehicle 14, the arm apertures 78, receiver apertures 30 and hitch apertures 32 are at least generally aligned. As with the receiver apertures 30 and hitch apertures 32, arm apertures 78 are sized and configured to tightly receive the locking device 28. As described with the embodiment above, it may be desirable or necessary to replace the standard locking device 28 with a high strength locking device 28 of slightly longer length, with a high strength bolt or like component to secure the components together.

Figure 12:
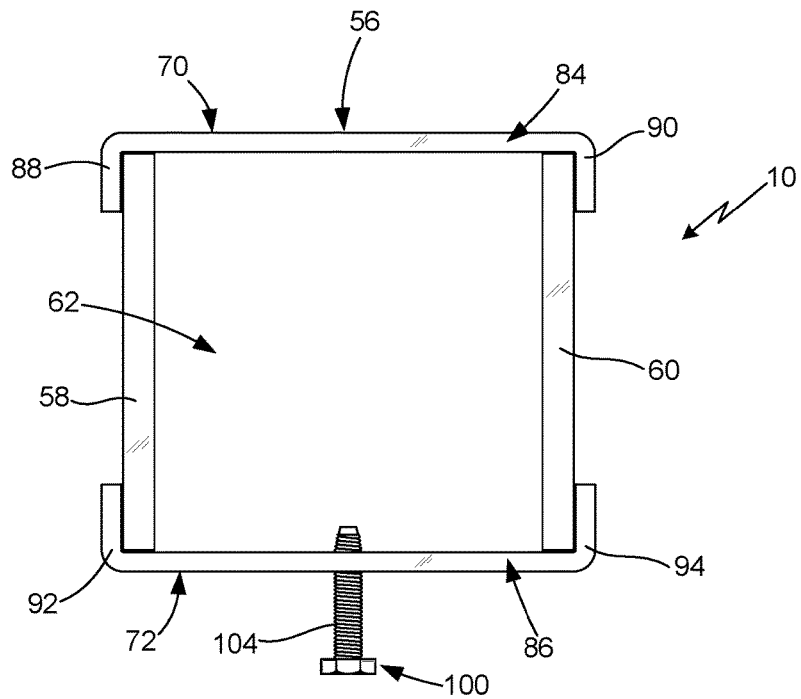
FIG. 12 is a back view of the adapter of FIG. 9.
Figure 13:
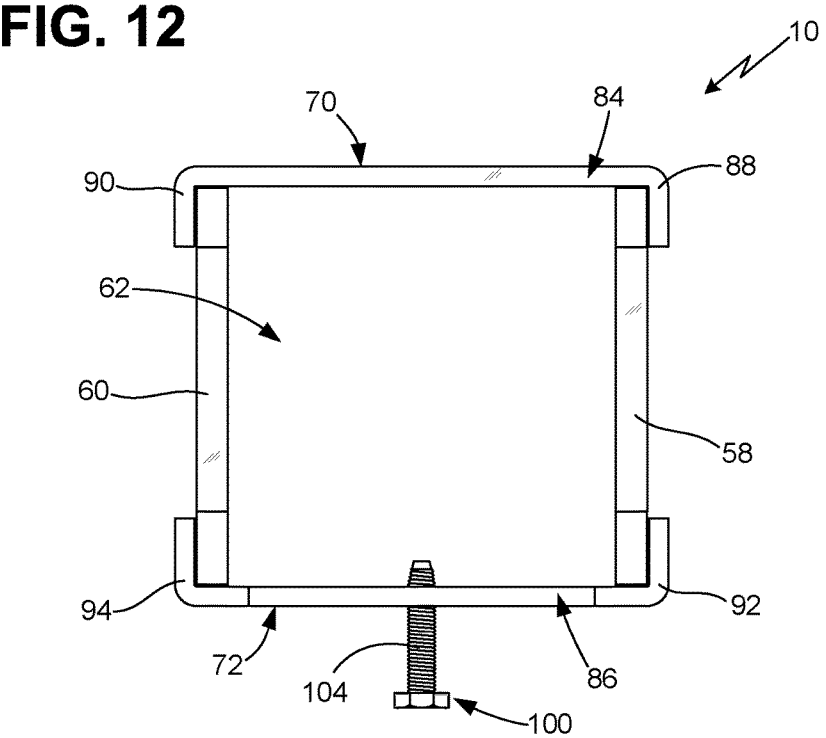
FIG. 13 is a front view of the adapter of FIG. 9.
Figure 14:
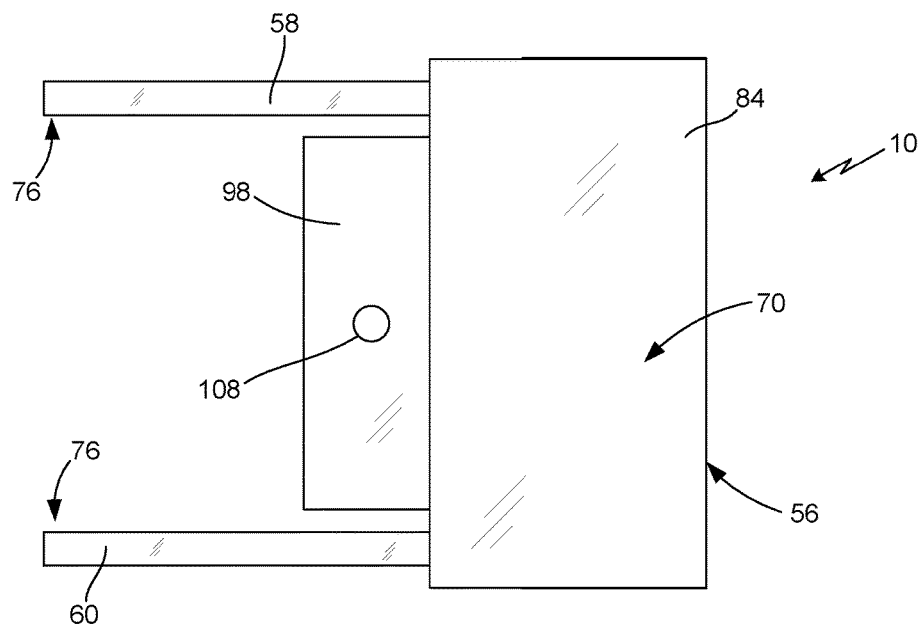
FIG. 14 is a top view of the adapter of FIG. 9 shown without the leveling/locking mechanism.
Figure 15:
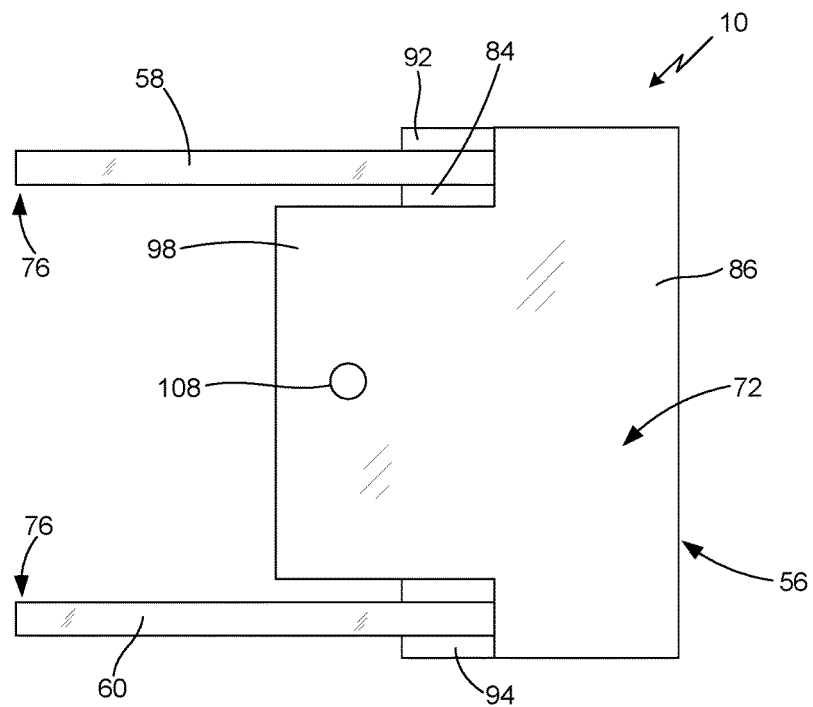
FIG. 15 is a bottom view of the adapter of FIG. 14.

The adapter 10 can be a single integral component or, as shown in FIGS. 9 through 15, the adapter 10 can comprise a plurality of components that are joined together to form adapter 10. In the embodiment shown, the adapter 10 has generally T-shaped arms 58/60 that are turned sideways, an upper section 84 that has an inversed U-shaped portion that engages the upwardly extending portions of arms 58/60 and a lower section 86 that has a U-shaped portion which engages the downwardly extending portions of the arms 58/60, as best shown in FIGS. 9, 12 and 13. Upper section 84 has downwardly extending side members 88 and 90 and lower section 86 has upwardly extending side members 92 and 94. As shown, the downwardly extending side members 88/90 of upper section 84 engage and connect to the upwardly extending portion of arms 58/60 and the upwardly extending side members 92/94 of lower section 86 engage and connect to the downwardly extending portion of arms 58/60. The opening 62 is defined by the inner surfaces of arms 58/60, top side 72 and bottom side 74, as best shown in FIGS. 9 and 12. In a preferred configuration, the various components are welded together or, depending on the material utilized for the adapter 10, joined by a sufficiently strong adhesive. Alternatively, these components can be joined by one or more connecting elements (not shown), such as screws, bolts, rivets or the like. As well known by persons skilled in the relevant art, a wide variety of mechanisms 96 can be utilized to connect the side members 88/90 and 92/94 to the arms 58/60. Once connected, the adapter 10 should function as a single integral unit that is sized and configured to be in close conformance with and sufficiently engage the receiver collar 22 and support an apparatus 52 that is attached to or integral with the adapter collar 56 and/or extension arms 58/60 so the apparatus 52 can be utilized by the vehicle 14 or one or more items 54 can be carried by the vehicle 14 on apparatus 52. As with the above embodiment, the adapter 10 of this embodiment will typically be manufactured from a metal such as steel, aluminum, stainless steel or other suitable alloys. If desired, certain composite materials may also provide sufficient strength features to be utilized for adapter 10.

The embodiment of the adapter 10 shown in of FIGS. 9-15 also has a bottom extension member 98 that extends forward from the adapter collar 56 of the adapter 10. As best shown in FIG. 10, bottom extension member 98 extends forward of receiver collar 22 under receiver 18 and can be utilized to support one or more leveling and/or locking engaging mechanisms 100 that are associated with the bottom extension member 98 to engage the bottom surface 102 of the receiver 18 of the tow hitch assembly 12. The engaging mechanism 100 allows the user to adjust the positioning of adapter 10 on receiver 18 to ensure that the apparatus 52 is in the proper position (i.e., upright position or generally vertical—i.e., not leaning sideways) and to lock the adapter 10 to the receiver 18. The engaging mechanism 100 also prevents rattling or like noises when the vehicle 14 is being driven with the adapter 10, apparatus 52 and items 54 supported on the tow hitch assembly 12, which can be annoying to the user of adapter 10 and apparatus 52. A variety of different engaging devices can be utilized for engaging mechanism 100, including the set screw 104 shown in FIGS. 11 through 15. In this embodiment, set screw 104 is received through and engages an aperture 108, shown in FIG. 14, positioned through the bottom extension member 98. In use, as shown in FIG. 10, the distal end of the set screw 104 contacts against the bottom surface 102 of the receiver 18 to level/lock adapter 10 in place thereon. As well known in the art, a variety of screws, bolts, pins and other devices can be utilized for the engaging device 104.

As set forth above, the adapter 10 is utilized to support an apparatus 52 on a tow hitch assembly 12 of a vehicle 14 so the apparatus 52 can be utilized with the vehicle 14 and/or utilized to carry one or more items 54 so the items 54 may be transported by the vehicle 14. In the embodiment of FIG. 5, which shows the adapter 10 of FIGS. 1 and 3-4, the apparatus 52 is a bicycle rack 110 and the items 54 are bicycles 112 and 114. The adapter 10 is attached to or integral with one or more components of the bicycle rack 110 so the bicycle rack 110 can be supported by the adapter 10 when it is mounted on the tow hitch assembly 12 of vehicle 14. As will be readily appreciated by persons skilled in the art, the new adapter 10 allows the tow hitch assembly 12 to support the apparatus 52 and items 54 and to also be utilized to tow a towable vehicle 16, as shown in FIG. 5. In this embodiment, the bicycle rack 110 has a first frame member 116 that attaches to or is integral with the adapter 10 so as to extend upward therefrom a sufficient distance to allow the tow tongue 40 associated with the towable vehicle 16 to engage the hitch ball 38, as shown in FIG. 5. A second frame member 118 extends rearwardly and generally horizontally from the first frame member 116 to define a carrying space 120 for the two bicycles 112/114 behind the vehicle 14 in a manner that does not interfere with the towing or other movement, particularly turning movement, of towable vehicle 16. In the embodiment shown, the second frame member 118 is integral with the first frame member 116. Alternatively, the two frame members 116/118 can be connected together utilizing one or more frame connecting elements that are well known in the art. An elbow member 122 connects the second frame member 118 with a third frame member 124 that extends upwardly in a generally vertical orientation from the second frame member 118 a sufficient distance to allow the bicycles 112/114 to be positioned above the second frame member 118 in the carrying space 120 so the tires 126 do not contact second frame member 118, as shown in FIG. 5. As shown in FIG. 5, the fourth frame member 128 extends forwardly and generally horizontally from third frame member 124 across the carrying space 120. In this embodiment, the fourth frame member 128 is integral with the third frame member 124. In an alternative configuration of the bicycle rack 110, the two frame members 124/128 are connected together. In other configurations, one or more of the frame members, such as second frame member 118, can be telescopically configured to also ease the movement of bicycles 112/114 onto or off of bicycle rack 110. A bicycle securing mechanism 130 (a clamp like member) attached to fourth frame member 128 is utilized to secure bicycles 112/114 to the bicycle rack 110 so the bicycles 112/114 may be securely and safely transported by vehicle 14. In one embodiment, one or more portions of the bicycle rack 110 utilizes commercially available bicycle rack components. For instance, the third frame member 124, fourth frame member 128 and the bicycle securing mechanism 130 are generally available as a single as a part of many prior art bicycle rack systems.

Figure 16:
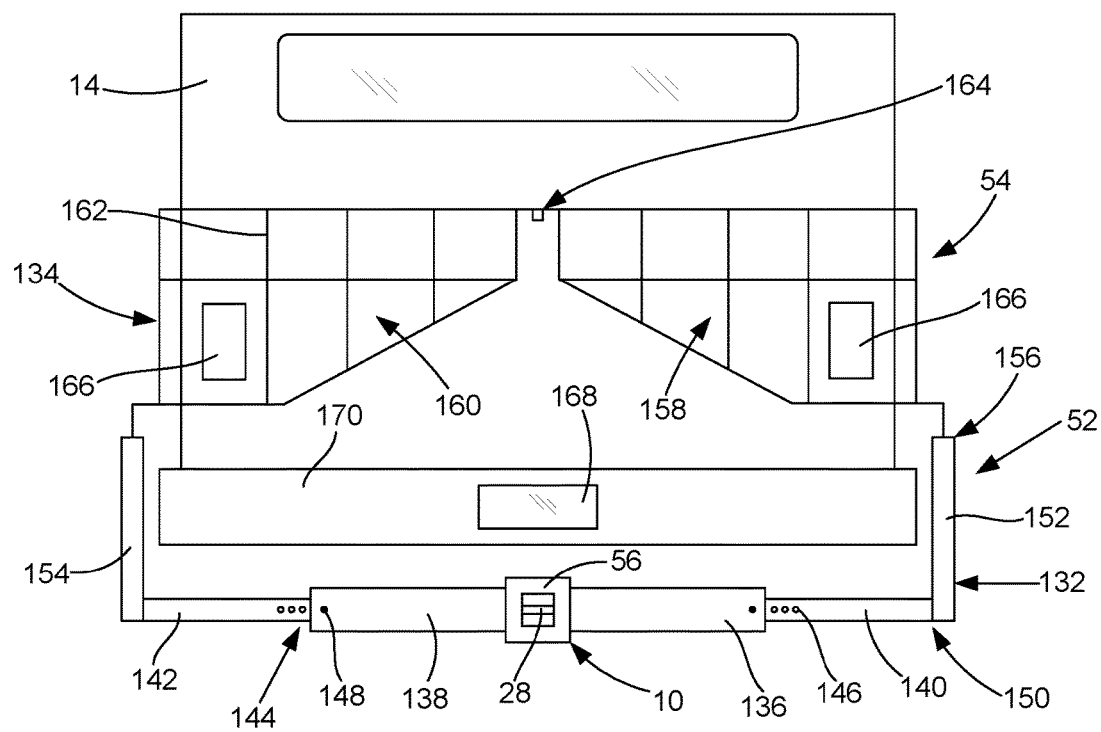
FIG. 16 is a back view of an adapter shown in use on a vehicle having a tow hitch assembly to support an apparatus configured as a pair of gates at the rear of the vehicle.
Figure 17:
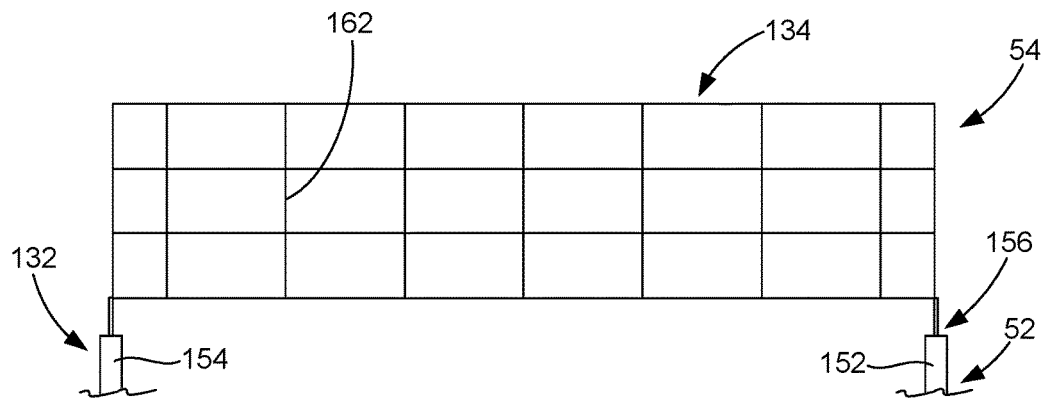
FIG. 17 is a back view of an apparatus configured as a barrier for use at the rear of the vehicle.

As shown in FIG. 16, the useful apparatus 52 can be a carrier apparatus 132 that is attached to or integral with adapter 10 and is utilized, as shown in FIGS. 16 through 20, to carry one or more items 54. In FIG. 16, the item 54 is a gate assembly 134 that pivotally attaches to the carrier apparatus 132 to selectively close off or allow access to the area behind the gate assembly 134, such as the bed of a truck or the like. The carrier apparatus 132 comprises a pair of primary support arms 136 and 138 that extend outward generally horizontally along the width of vehicle 14 from adapter 10. Each primary support arm 136/138 attaches to a carrier arm 140/142 that is associated therewith to extend the full width of vehicle 14. To allow for different widths of vehicles 14, preferably each of the carrier arms 140/142 are telescopically attached to their respective primary support arm 136/138 utilizing a telescoping mechanism 144. In the configuration of FIG. 16, the telescoping mechanism 144 comprises a plurality of apertures 146 on each of the carrier arms 140/142 that are sized and configured to removably receive an engaging pin 148 to lock the carrier arms 140/142 to their respective primary support arms 136/138. At the distal end 150 of each carrier arm 140/142 is provided a vertical section, shown as 152 and 154 respectively, that extends generally upward from the horizontal sections of carrier arms 140/142. The gate assembly 134 pivotally attaches to the upper end 156 of the vertical sections 152/154 of each carrier arm 140/142. In the embodiment of FIG. 16, the gate assembly 134 comprises a first gate section 158 and a second gate section 160 that are each made up of a plurality of gate frame members 162. In a preferred configuration, a locking mechanism 164 secures the two gate sections 158/160 together when the gate assembly 134 is in its closed condition, as shown in FIG. 16. The locking mechanism 164 can comprise a pin/socket device, padlock, chain or other devices that are commonly utilized in the prior art to join two swinging gate sections together or to join one swinging gate section to a post. Preferably, the various gate frame members 162 are assembled so as to not interfere with being able to see the tail lights 166 and the vehicle license plate 168. In addition, the gate frame members 162 should be sized and configured so the vehicle bumper 170 does not interfere with the operation of the gate assembly 134. Many different configurations of gate assembly 134 will be suitable for use with the adapter 10 of the present invention. For instance, FIG. 17 shows a gate assembly 134 that is made up of a single gate section. The gate assembly 134 of FIG. 17 can be configured so that one end of the gate assembly 134 pivots outwardly at the upper end 156 of one of vertical sections 152/154 to swing open or closed, both ends of gate assembly 134 pivot downward at the upper ends 156 of vertical sections 152/154 or gate assembly 134 can be fixed in position (i.e., no swinging or pivoting of the gate assembly 134). As will be readily appreciated by persons who are skilled in the relevant art, many other configurations for the gate assembly 134 are also possible.

Figure 18:
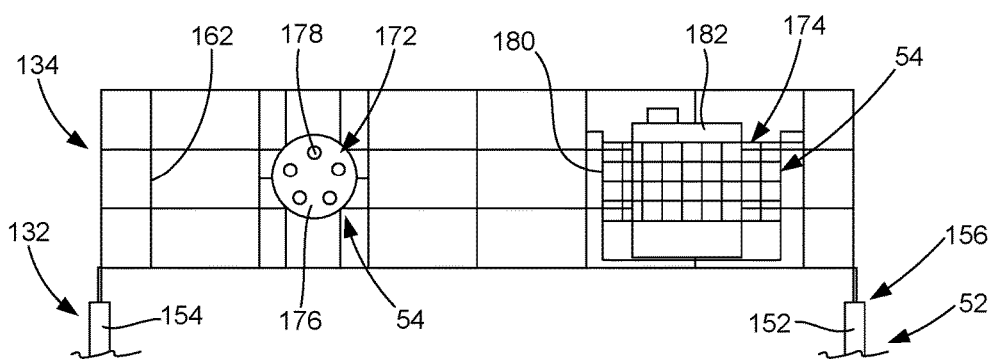
FIG. 18 is a back view of the apparatus of FIG. 17 shown in use supporting a tire mount and a storage bin, with the storage bin holding a fuel container.

The embodiment of FIG. 18 shows use of the gate assembly 134 of FIG. 17 to support a tire mount 172 and a storage bin 174 thereon as the items 54. Tire mount 172 can be configured with a support plate 176 having a plurality of outwardly extending lugs 178 that are sized and configured to receive a wheel so the user can carry a spare tire on the gate assembly 134 to have available for vehicle 14 in case the spare tire is needed on the vehicle 14. The storage bin 174 can be made up of a plurality of bin frame members 180 that are configured to support various objects therein, such as a fuel container 182 that stores extra gasoline or other fuel for vehicle 14 or for a lawnmower, stove or other fuel consuming equipment so the fuel container 182 will not have to be carried inside the vehicle 14 or in the trunk or bed associated with vehicle 14. In an alternative configuration, panels or other structural members can be utilized instead of or in conjunction with the bin frame members 180 to define storage bin 174. Storage bin 174 can be utilized to carry a wide variety of different objects.

Figure 19:
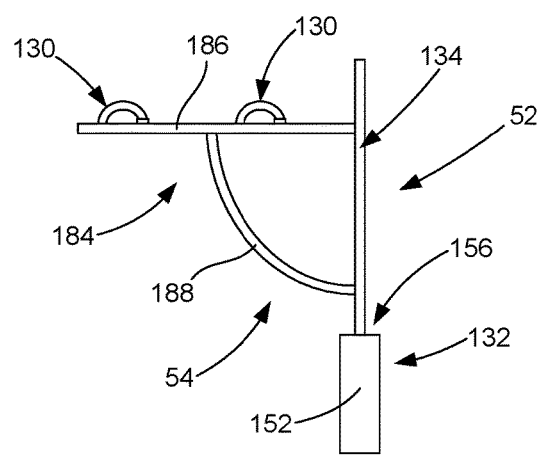
FIG. 19 is a side view of the apparatus of FIG. 17 shown in use supporting a bicycle rack.
Figure 20:
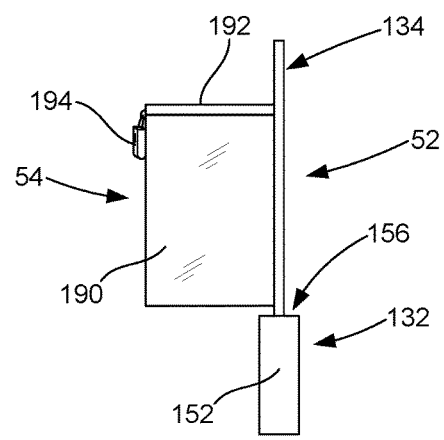
FIG. 20 is a side view of the apparatus of FIG. 17 shown in use supporting a tool box or like enclosed container.

The embodiment shown in FIG. 19 is a side view of a bicycle rack 184 having a different configuration than the bicycle rack 110 of FIG. 5. In this configuration, the bicycle rack 184 has two or more horizontal members 186 that extend rearwardly and horizontally from the gate assembly 134 of FIG. 17 and a brace member 188 that interconnects the horizontal member 186 and the gate frame members 162 to support the horizontal member 186 so that it may support one or more bicycles 112/114 thereon at the bicycle securing mechanisms 130 on the horizontal member 186. If desired, presently available bicycle racks, in whole or part, can be utilized for bicycle rack 184. Other configurations for the bicycle rack 184 are also adaptable for use with the adapter 10 of the present invention. FIG. 20 shows an embodiment of the present invention where the gate assembly 134, as the apparatus 52, supported by the carrier apparatus 132 is utilized to support and carry a large tool box 190 so that tool box 190 may be transported by vehicle 14 on tow hitch assembly 12 thereof. In the embodiment shown in FIG. 20, the tool box 190 has a lid 192 that pivots open and closed and has a lock or other locking mechanism 194 to secure the tools and other materials inside the tool box 190. For use with either bicycle rack 184 or tool box 190, the gate assembly 134 can be configured to pivot relative to the carrier apparatus 132 to allow the user to swing the gate assembly 134 open and closed relative to vehicle 14. As set forth above, the adapter 10 can be configured to supportedly carry a wide variety of other apparatuses 52 that can be used to moveably support one or more items 54 so the apparatus 52 can be used with vehicle 14 and/or the various items 54 can be transported by vehicle 14.

Figure 21:
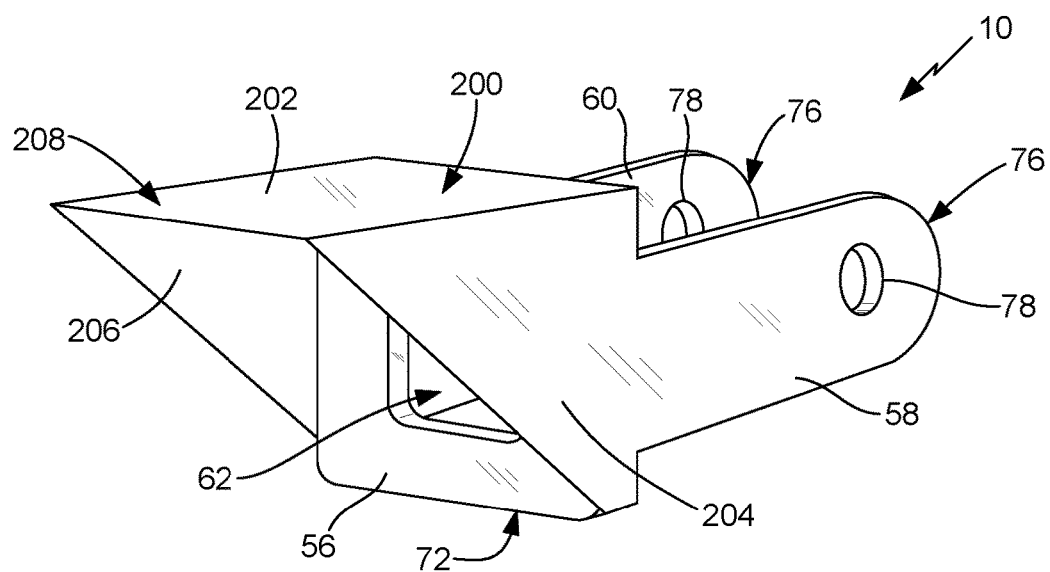
FIG. 21 is a right side perspective view of an adapter for supporting an apparatus on a vehicle tow hitch assembly configured according to a third embodiment of the present invention.
Figure 22:
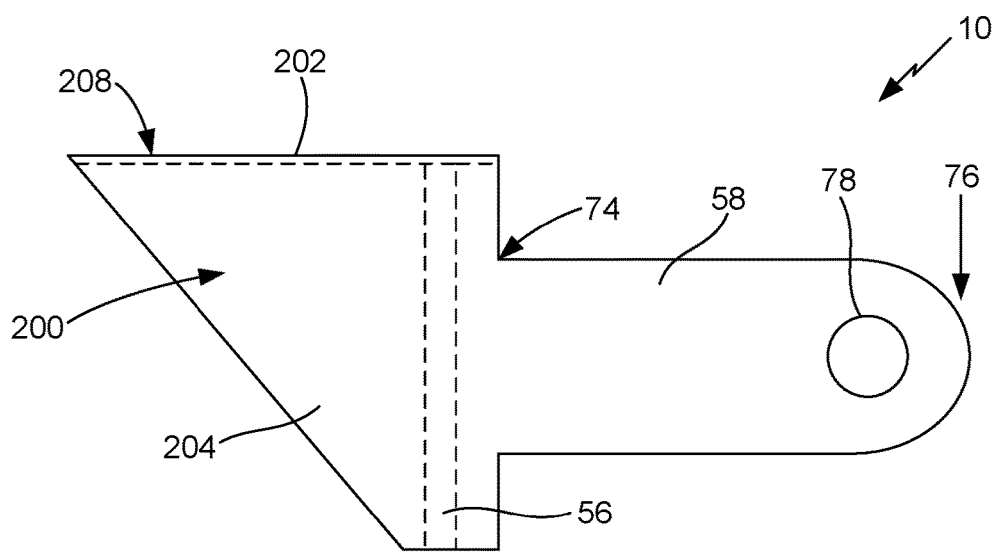
FIG. 22 is a right side view of the adapter of FIG. 21.

A third embodiment of the adapter 10 of the present invention is shown in FIGS. 21 and 22. As with the first two embodiments, the adapter 10 of this embodiment is supported by the tow hitch assembly 12 and adaptable for connection (whether by attachment or being integrally formed) with an apparatus 52 to be utilized with the vehicle 14 by itself or to enable the vehicle 14 to carry one or more items 54. The adapter 10 of the third embodiment is configured somewhat similar to the embodiment of FIGS. 1 and 3-4 except that it has an extension section 200 comprising a top extension member 202 and a pair of side extension members, shown as 204 and 206 in FIG. 21, that are integrally formed or attached to the forwardly extending arms 58/60 so as to be positioned to extend rearwardly of the adapter collar 56, as shown in FIGS. 21-22. The top extension member 202 of extension section 200 is integral with or attached to the top side 70 of adapter collar 56 and the side extension members 204/206 are integral with or attached to the first side 66 and second side 68, respectively. The top extension member 202 and the side extension members 204/206 define a plurality of extension surfaces 208 on which the apparatus 52 can be attached to the adapter 10. In this embodiment, the collar opening 62 is sized and configured to fit over and be supported by the standard hitch shaft 24, but sides 66, 68 and 70 are not directly utilized to attach the adapter 10 to the apparatus 52. Instead, apparatus 52 attaches to outer extension surfaces 208, bottom side 72 and/or arms 58/60. It is believed that the extension section 200 can be formed from a single piece of metal by bending a simple pattern to shape and then welding adapter collar 56 to the inside of the extension section 200. In use, the adapter collar 56 engages the tow hitch assembly 12 as described above to secure the adapter 10 to the tow hitch assembly 12.

The present invention also describes an adapter support assembly 210 that is utilized to effectively, safely and functionally support the apparatus 52 on the tow hitch assembly 12 of a vehicle 14 so the apparatus 52 can support one or more items 54 which are desirably moved and/or utilized with the vehicle 14, as shown in FIG. 5. It is likely that the primary benefit of the new support assembly 210 is when the vehicle's tow hitch assembly 12 is being utilized to tow a towable vehicle 16 and it is necessary to position the items 54 in the carrying space 120 between the vehicle 14 and the towable vehicle 16. The support assembly 210 is structured and arranged to position the apparatus 52 and items 54 in the carrying space 120 so they will not be damaged or cause any damage to the vehicle 14 and/or towable vehicle 16, particularly when the vehicle 14 is making a turn. In normal use, the present support assembly 210 efficiently utilizes the carrying space 120 and is configured to accommodate a wide variety of different types of apparatuses 52, items 54 and contour shapes of the rear of the vehicle 14 such that the support assembly 210, apparatus 52 and items 54 will not be damaged. The support assembly 210 comprises an apparatus 52 directly connected to or integral with an adapter 10, as described above, that is configured to allow use of the tow hitch assembly 12 for its intended purpose, which is to receive a hitch shaft 24 in the receiver 18 to tow a towable vehicle 16 with the vehicle 14. The configuration of the support assembly 210 described below also accomplishes this objective. In addition, the support assembly 210 described below also provides a second receiver, shown as 224 in FIGS. 23, 31-34 and 39, that is utilized to receive and support the apparatus 52 on the tow hitch assembly 12, typically by connecting to or being integral with an adapter 10 that is sized and configured to be attached to the tow hitch assembly 12.

Figure 23:
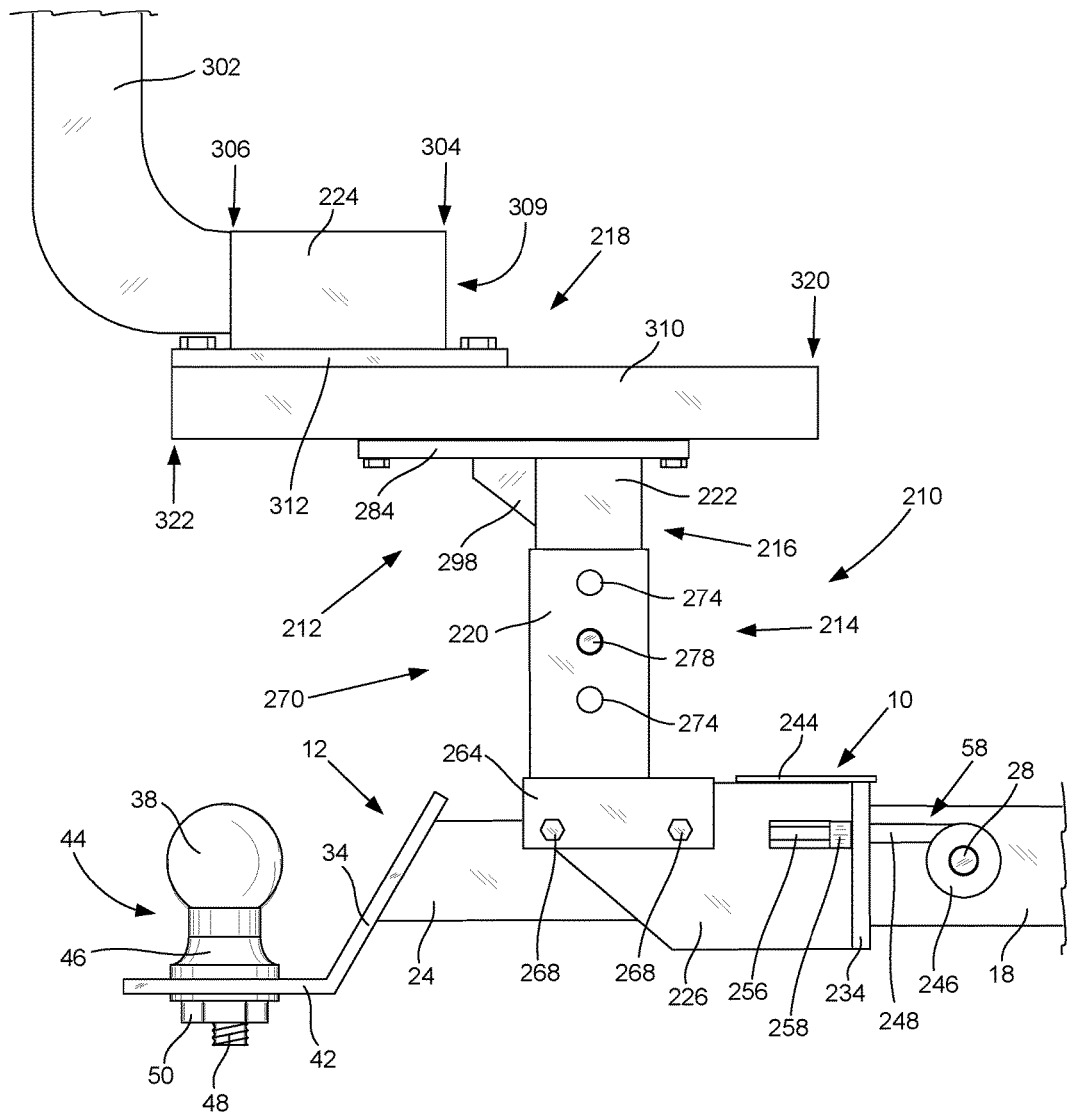
FIG. 23 is a right side view of an adapter for supporting an apparatus on a vehicle tow hitch assembly configured according to a fourth embodiment of the present invention, with the adapter shown in its upwardly disposed position mounted on a vehicle tow hitch assembly and supporting an accessory component that is utilized to connect to an apparatus for supporting one or more items to be carried by or used with the vehicle having the tow hitch assembly.

A fourth embodiment of adapter 10 of the present invention is shown in FIGS. 23-39. As with the first three embodiments, adapter 10 of the present embodiment is supported by the tow hitch assembly 12 and adaptable for connection (whether by attachment or being integrally formed) with an apparatus 52 to be utilized with the vehicle 14 by itself or to enable the vehicle 14 to carry one or more items 54. The fourth embodiment of adapter 10 is configured with many of the same components shown in the first three embodiments. The adapter 10 of the fourth embodiment is supported by two side members 226/228 substantially abutting the sides of the collar 22 of the tubular receiver 18 while the collar 56 of the adapter 10 is simultaneously drawn tightly against the rearward face of the collar 22 of the tubular receiver 18 by the adjustable length arms 58/60. As best shown in FIGS. 23 and 39, the adapter 10 of the fourth embodiment has forwardly extending arms 58/60 that provide arm apertures 78 which can be placed in alignment with the receiver apertures 30 and hitch apertures 32 so the elongated locking device 28 can be placed through all of the apertures 30/32/78 to securely connect the components together to, in effect, define a single unit.

As set forth in more detail below, unlike the previous embodiments, the arms 58/60 of the fourth embodiment of the adapter 10 are configured to be adjustable in length to allow selective positioning of the adapter collar 56 relative to the hitch collar 22. In the fourth embodiment, the adapter 10 is structured and arranged to support an accessory component 212 that comprises a component tube assembly 214, a component shaft assembly 216 and a second receiver assembly 218. The support assembly 210 comprises the adapter 10 and the accessory component 212. As set forth in more detail below, the component tube assembly 214 is sized and configured, in a preferred configuration, to support a cooperatively configured component shaft assembly 216 that is attached to or integral with a second tubular shaped receiver assembly 218 having a second receiver 224 with a tubular channel 300 defining a second rearward opening 308 at its second or rearward end 306 and a forward facing opening 309 at its first or forward end 304. An apparatus 52 can be attached to either the rearward or forward opening so the apparatus 52 can be supported by the tow hitch assembly 12 of vehicle 14 to carry one or more items 54. In one configuration, adapter 10 is configured so the component tube assembly 220 can be pivoted between an upwardly disposed position 270 and to or at least toward a rearwardly disposed position 272, as shown in FIGS. 23 and 39. The pivoting feature allows a person to pivot the apparatus 52 out of the way so he or she can easily access the back of the vehicle 14 (i.e., either the vehicle interior through a door or window of the vehicle 14 or access the bed or trunk of the vehicle 14). In a preferred configuration, the second receiver assembly 218 is slidably supported on the component shaft assembly 216 so the user can selectively position apparatus 52 in the carrying space 120 between the vehicle 14 and the towable vehicle 16 in a manner that will prevent the apparatus 52, second receiver assembly 218 and/or items 54 from contacting the vehicle 14 or the towable vehicle 16 when vehicle 14 is making a turn while turning the towable vehicle 16 under normal driving conditions. The component tube assembly 214 has a component tube 220, the component shaft assembly 216 has a component shaft 222 and the second receiver assembly 218 has a second receiver 224. The above features of the support assembly 210 are set forth in more detail below.

Figure 24:
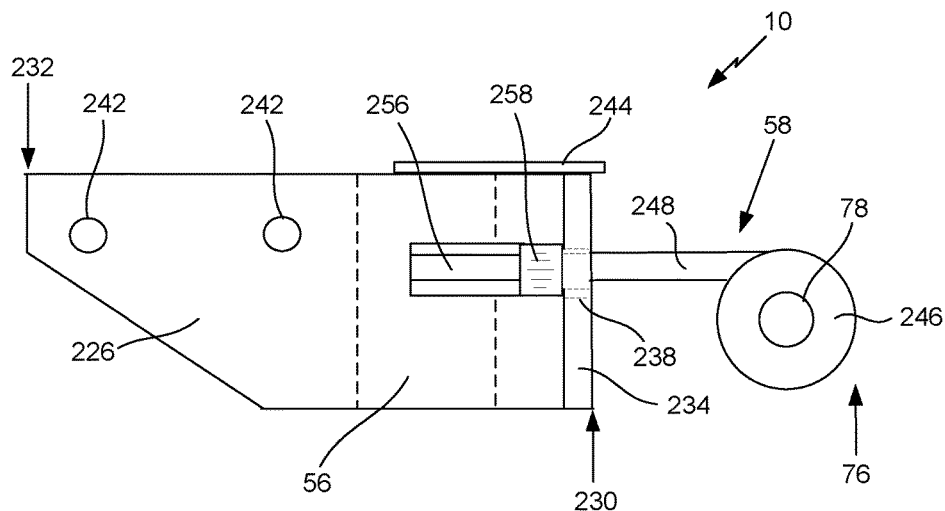
FIG. 24 is right side view of the adapter of FIG. 23 shown separate from the accessory component and tow hitch assembly.
Figure 25:
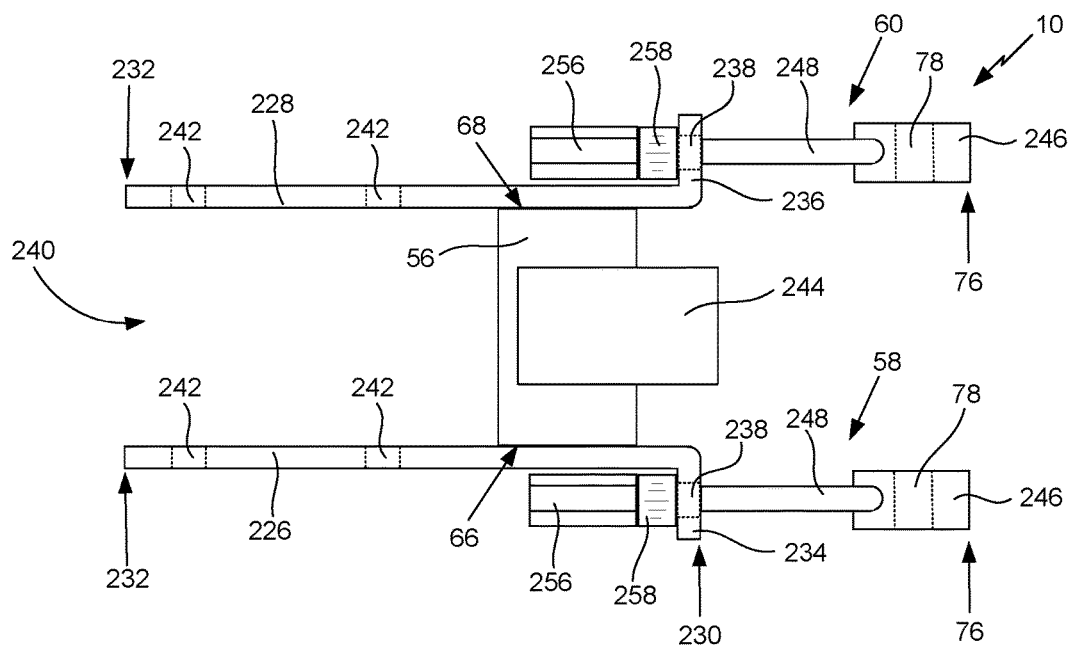
FIG. 25 is a top view of the adapter of FIG. 24.
Figure 26:
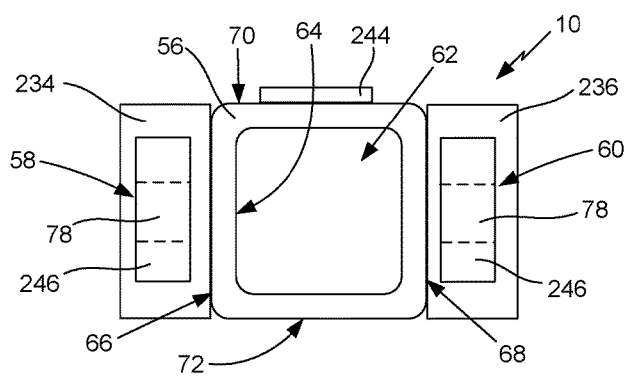
FIG. 26 is a back view of the adapter of FIG. 25.
Figure 36:
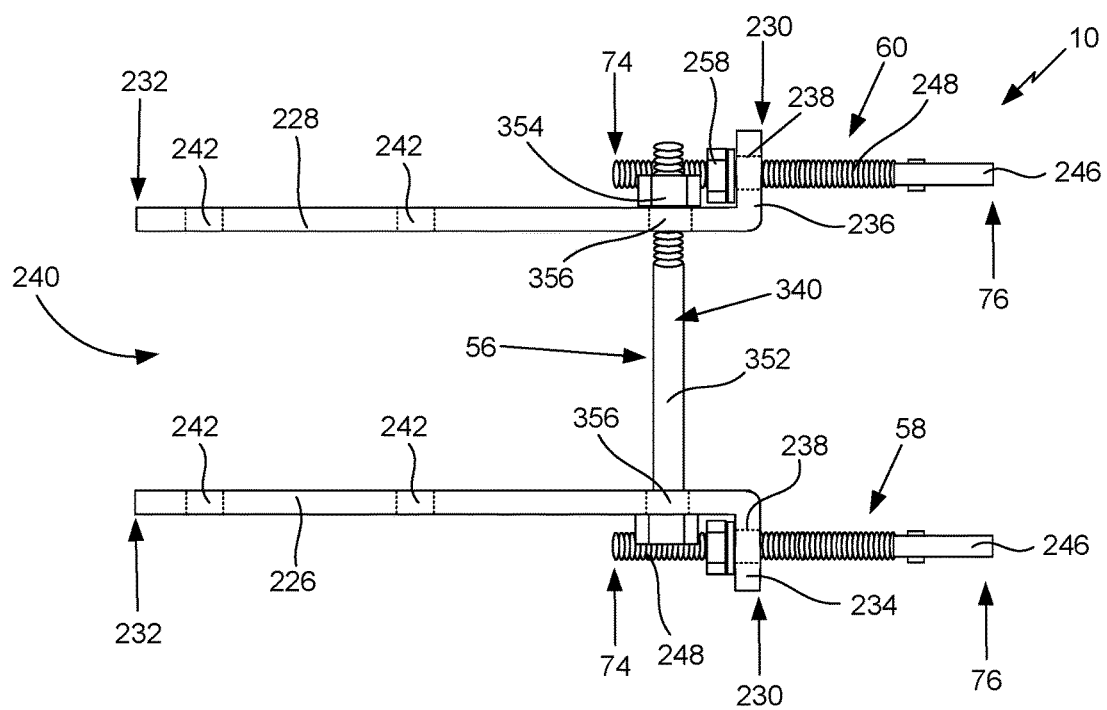
FIG. 36 is a top view of the adapter of FIG. 35.

The adapter 10 of the fourth embodiment, best shown in FIGS. 23-28, has an adapter collar 56 that is thicker than the adapter collars 56 shown in the first three embodiments. Attached to or integral with the first side 66 of adapter collar 56 is a rearwardly disposed first side member 226. Attached to or integral with the second side 68 of adapter collar 56 is a rearwardly disposed second side member 228, as best shown in FIGS. 23-25 and 28. Each of the side members 226/228 has a first or forward end 230 and a second or rearward end 232 with an outwardly projecting flange, shown as first outwardly projecting flange 234 and second outwardly projecting flange 236 at or near the first/forward end 230, as best shown in FIGS. 25-26 and 28. Each of the outwardly projecting flanges 234/236 has a flange aperture 238 through which a portion of the forwardly extending arms 58/60 are received (as set forth below). The two side members 226/228 define a shaft receiving area 240 therebetween that is in alignment with the collar opening 62 to receive the hitch shaft 24 therein, as best shown in FIGS. 28, 36 and 38. In a preferred configuration of the adapter 10 of this embodiment, the two side members 226/228 are parallel to the hitch shaft 24 and the sides 66/68 of the adapter collar 56 and sized and configured so as to be in substantially abutting relation with the sides of the tow hitch assembly 12, specifically collar 22 of the tubular receiver 18, while the collar 56 of the adapter 10 is simultaneously drawn tightly against the rearward face of the collar 22 of the tubular receiver 18 by the adjustable length arms 58/60, as best shown in FIGS. 23, 28 and 39, to help secure and stabilize the adapter 10 on the hitch assembly 12. In certain circumstances, a set screw or the like may be needed to rigidly secure the side members 226/228 against the sides of the collar 22 of the tubular receiver 18. In addition to securing and stabilizing the adapter 10, the side members 226/228 are utilized in this embodiment to mount the component tube assembly 220 on the adapter 10. To accomplish this, each of the side members 226/228 has one or more mounting apertures 242 that are utilized to mount the component tube assembly 220 to the adapter 10, as shown in FIGS. 24-25, 27-28 and 39. Attached to or integral with the top side 70 of adapter collar 56 is a top extension member 244 that is sized and configured to extend over and be placed in abutting relationship with the top edge of the collar 22 on the receiver 18 when the adapter 10 is supported by the collar 22 of the tubular receiver 18 when the adapter 10 is placed on the tow hitch assembly 12, as shown in FIGS. 23-28 and 39. As with side members 226/228, the top extension member 244 helps secure and stabilize adapter 10 on tow hitch assembly 12.

In the fourth embodiment of the adapter 10 of the present invention, the forwardly extending arms 58 and 60 are configured somewhat differently than in the first three embodiments to allow the length of the arms 58/60 to be adjusted so as to place the arm apertures 78 in alignment with the receiver apertures 30 and hitch apertures 32 so the locking device 28 will be received through the apertures 30/32/78 to securely attach the adapter to the tow hitch assembly 12 so that an apparatus 52 can be safely carried by the vehicle 14, as shown in FIGS. 23 and 39. In this embodiment, each of the forwardly extending arms 58/60 comprises an arm mount 246 that defines the arm aperture 78, an elongated arm rod 248 having a first/forward end 250 and a second/rearward end 252 with the first end 250 being attached to or integral with the arm mount 246 and the second end 252 having a threaded section 254, an internally threaded rod connector 256 that threadably connects to the threaded section 254 of the arm rod 248 and a spacer element 258 received over the arm rod 248 between the rod connector 256 and the flanges 234/236, as best shown in FIGS. 23-25, 27-28 and 39. As shown in FIGS. 24-25, the second end 252 of the arm rod 248 extends rearward from the arm mount 246 through the flange aperture 238 in the outwardly extending flanges 234/236 when the spacer element 258 is placed over the second end 252 and the rod connector 256 is threaded onto the threaded section 254 of the arm rod 248.

Figure 27:
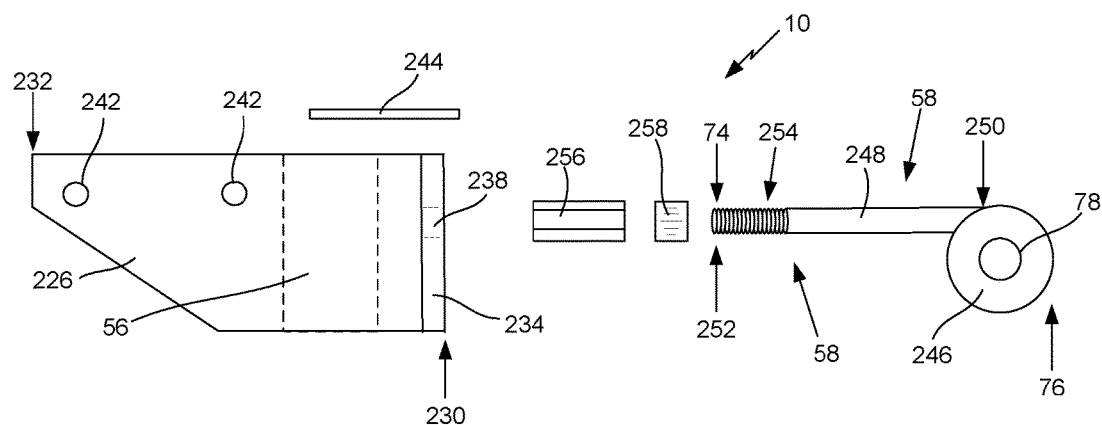
FIG. 27 is an exploded right side view of the adapter of FIG. 25.

In use, the adapter 10 is placed on the hitch shaft 24 with the top extension member 244 positioned over the collar 22 of the receiver 18. The arm apertures 78 of the arm mounts 246 are aligned with the receiver apertures 30 and hitch apertures 32, the locking device 28 is positioned through all of the apertures 30/32/78 and the second end 252 of the arm rods 248 are placed through the flange apertures 238. The spacer elements 258 are placed over the second end 252 of the arm rods 248 and the rod connectors 256 are threaded onto the threaded section 254 of the arm rod 248 a sufficient amount to push the forward end of the spacer element 258 in abutting relation with the rearward facing side of the outwardly projecting flanges 234/236, as shown in FIGS. 23 and 39. The rod connectors 256 are tightened to secure the adapter 10 to the tow hitch assembly 12, as shown in FIGS. 23 and 39. In the embodiment shown in the figures, the arm mount 246 is ring-shaped and the arm apertures 78 are round, as best shown in FIGS. 23-24 and 27. As will be readily appreciated by persons skilled in the art, however, these and the other components may be shaped, configured and attached (or made integral) in a variety of different manners. In addition, rod connector 256 may attach to the arm rod 248 in a manner other than being threadably attached and the spacer element 258 may be eliminated such that the rod connector 256 directly engages the outwardly projecting flanges 234/236.

The component tube assembly 214 primarily comprises a tubular shaped component tube 220 and a component base 264, as best shown in FIG. 29. The component tube 220 has a first/upper end 260 and a second/lower end 262, with the first/upper end 260 being open and the second/lower end 262 being attached to or integral with the component base 264 that is shaped and configured to attach, removably in a preferred embodiment, to the side members 226/228 of the adapter 10, as shown in FIGS. 23, 29 and 39. In the embodiment shown in the figures, the component tube 220 is generally shaped and configured the same as receiver 18 and the component base 264 is an inverted U-shaped member. In one configuration of the present invention, the component base 264 is fixedly attached to or integrally formed with the adapter 10 and the component tube 220 is fixedly attached to or integral with the component base 264. In a preferred configuration, however, the component base 264 has one or more base apertures 266 that allow the user to removably attach the component tube assembly 214 to the adapter 10. In the configuration shown in the figures, the base apertures 266 on mounting base 264 are positioned to be aligned with the mounting apertures 242 on each of the two side members 226/228 so connecting elements 268, such as bolts/nuts, screws and the like, can be utilized to secure the component base 264 to the adapter 10. In the preferred embodiment, the component base 264 has a pair of oppositely positioned base apertures 266 at or near the rearward end 232 of the side members 226/228 that can be loosened to allow the user to pivot the component tube 220 between an upwardly disposed position 270 and a generally rearwardly disposed position 272, as shown with regard to FIGS. 23 and 39, to allow the user to easily move an apparatus 52 out of the way so he or she can access the rear area (trunk, interior area, bed or the like) of the vehicle 14. When two base apertures 266 and connecting elements 268 are used on each side of the side members 226/228, as shown in the figures, the user will first remove the forwardly pair of connecting elements 268 prior to pivoting the component tube assembly 214 and the apparatus 52 (as well as any items 54 supportedly attached thereto).

As best shown in FIGS. 23 and 39, the component tube assembly 214 has a tubular shaped component tube 220 that is sized and configured to removably receive and support a cooperatively configured component shaft 222 of the component shaft assembly 216, with the component shaft 222 being sized and configured to be slidably received in the component tube 220 through the open upper end 260 thereof. In the configuration shown in the figures, the component tube 220 has one or more connecting apertures 274 and the component shaft 222 has one or more cooperatively positioned shaft apertures 276 that are placed in alignment with the connecting apertures 274 when the component shaft 222 is positioned inside the component tube 220, as shown in FIGS. 29 and 30. The connecting apertures 274 and shaft apertures 276 are sized and configured for a component engaging device 278, such as a pin or the like, to be placed through an opposing pair of connecting apertures 274 and an opposing pair of shaft apertures 276 to secure the component shaft 222 relative to the component tube 220, as shown in FIGS. 23 and 39. With the component shaft 222 sized and configured to be slidably received inside the component tube 220, the use of multiple connecting apertures 274 and/or multiple shaft apertures 276 allows the user to move the component shaft 222, and therefore the entire component shaft assembly 216 and the second receiver assembly 218, upward and downward relative to the component tube assembly 214. The slidable configuration of the component tube 220 and component shaft 222 allows the user to vertically adjust the height of the second receiver 224, when the component tube 220 is in its upwardly disposed position 270, as may be needed to avoid interference between the second receiver assembly 218 and the rear bumper, under which the receiver 18 is positioned, of the vehicle 14 having the tow hitch assembly 12.

In addition to the component shaft 222, which has an upper end 280 and a lower end 282, the component shaft assembly 216 also has a receiver support base 284, as shown in FIG. 30, that is structured and arranged to slidably support the second receiver assembly 218, as best shown in FIGS. 23 and 39. The receiver support base 284 has a first or forward end 286 and a second or rearward end 288, as shown in FIG. 30. Near each of the first/forward end 286 and second/rearward end 288 of the receiver support base 284 are located apertures 290 that are each sized and configured to receive a slidable mounting mechanism 292 that is configured to slidably engage, as set forth in more detail below, the second receiver assembly 218 so as to allow the second receiver 224 to move forward and rearward relative to the receiver support base 284 and, therefore, the component shaft assembly 216, component tube assembly 214, the tow hitch assembly 12 and vehicle 14, as shown in FIGS. 23 and 39. In the embodiment shown in the figures, the slidable mounting mechanism 292 comprises an engaging plate 294 and a plate connecting element 296 that connects to the engaging plate 294. The plate connecting element 296 is sized and configured to pass through the aperture 290 and connect to the engaging plate 294. In the figures, the plate connecting element 296 is a bolt, screw or the like that threadably engages the engaging plate 294, as shown in FIG. 30. As set forth in more detail below, the engaging plate 294 is sized and configured to engage a slidable component of the second receiver assembly 218 and to clamp against that component and, therefore, clamp the second receiver assembly 218 in place on the receiver support base 284. The component shaft assembly 216 also comprises a brace member 298 that interconnects component shaft 222 and the receiver support base 284, as best shown in FIG. 30, to prevent undesirable pivoting or other movement of the receiver support base 284 when the second receiver assembly 218 and the apparatus 52 (as well as any items 54 that are on or supported by the apparatus 52) are supported by the adapter 10 of the present invention.

Figure 31:
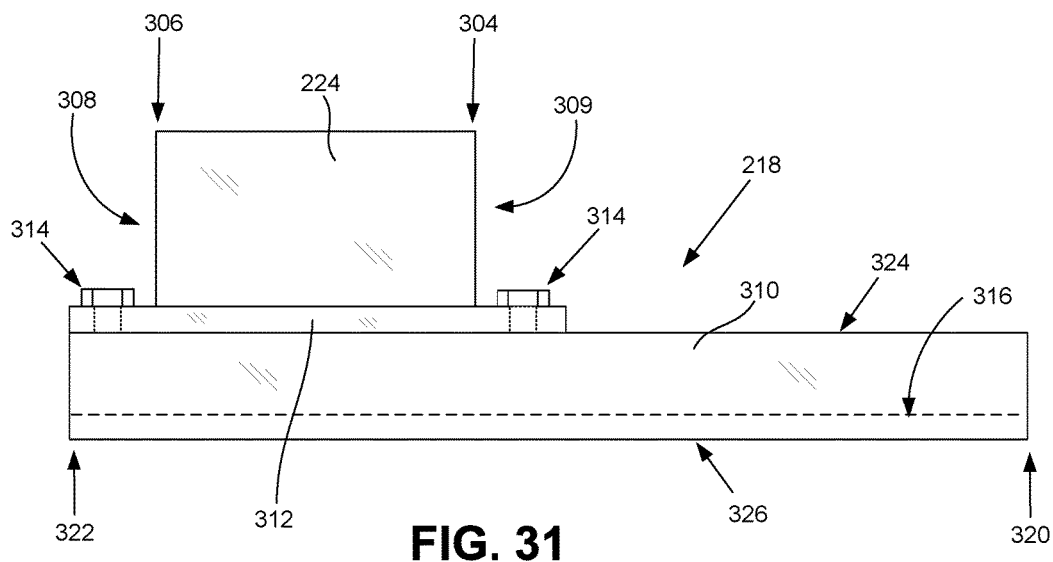
FIG. 31 is a right side view of the second receiver assembly of FIG. 23 shown separate from the adapter, tow hitch assembly, component tube assembly, component shaft assembly and second receiver assembly of FIG. 23.
Figure 32:
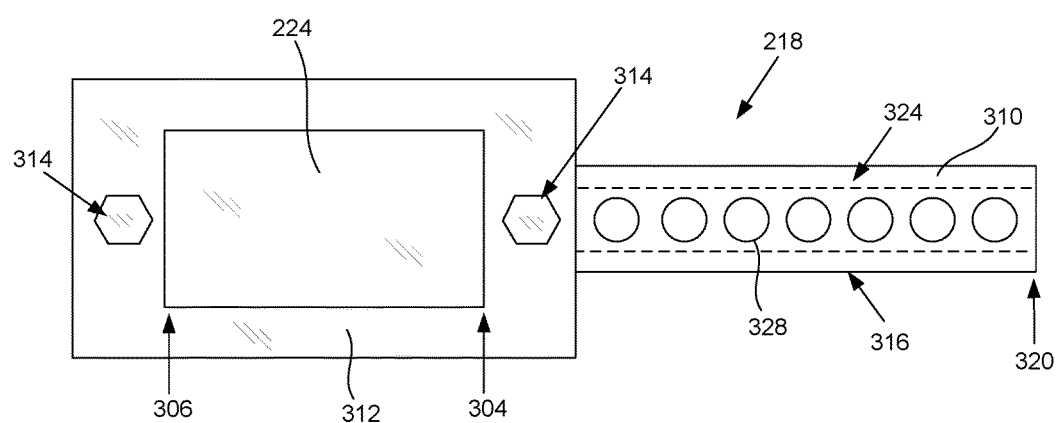
FIG. 32 is a top view of the second receiver assembly of FIG. 31.
Figure 33:
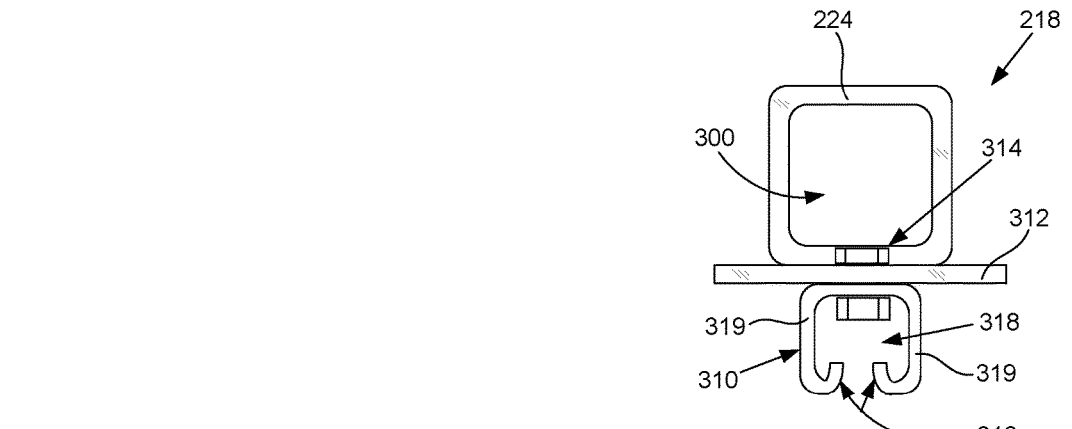
FIG. 33 is a back view of the second receiver assembly of FIG. 31.
Figure 34:
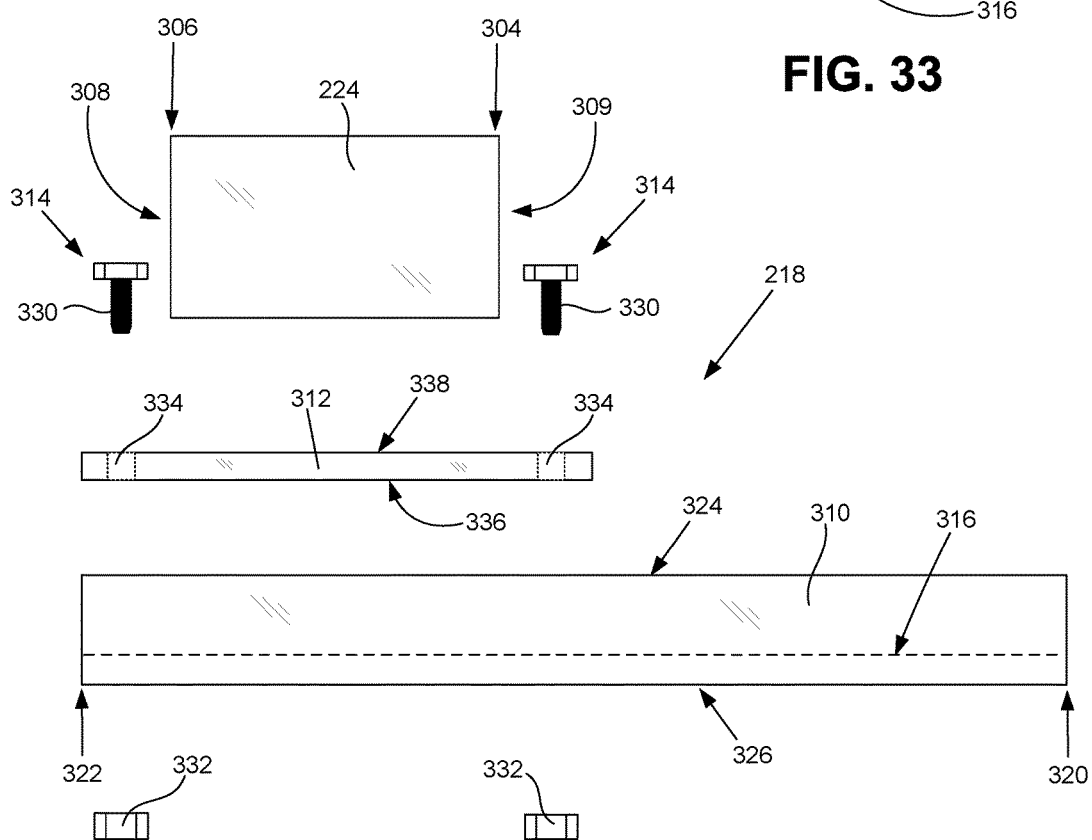
FIG. 34 is an exploded right side view of the second receiver assembly of FIG. 31.

In one embodiment, the second receiver 224 can be integral with or attached to, either fixedly or removably, the receiver support base 284 to provide a second tubular channel 300 sized and configured to receive a cooperatively configured support shaft 302 that is attached to or integral with the apparatus 52 so the apparatus 52 can be removably secured to the accessory component 212 when the support shaft 302 is positioned in the tubular channel 300 of the second receiver 224. As best shown in FIGS. 31-32 and 34, the second receiver 224 has a first/forward end 304 and a second/rearward end 306 with the tubular channel 300 being disposed therethrough. In a preferred configuration of the support assembly 210 of the present invention, the tubular channel 300 extends entirely through second receiver 224 (i.e., between the first/forward end 304 and second/rearward end 306) to define at least a rearward facing opening 308 at the second/rearward end 306 of the second receiver 224 and a forward facing opening 309 at the first/forward end 304 of second receiver 224, as best shown in FIGS. 33 and 34. As set forth above, the second receiver assembly 218, to which the second receiver 224 is attached, is sized and configured to receive the support shaft 302 in the tubular channel 300 to support the apparatus 52, and any items 54 thereon, on the tow hitch assembly 12 associated with vehicle 14. In the configuration described above, the second receiver 224 would be fixed in position relative to the component shaft assembly 216, component tube assembly 214, adapter 10 and tow hitch assembly 12. In a preferred embodiment, however, the accessory component 212 is configured so the user can move the second receiver 224 forward and rearward so the apparatus 52 can be positioned so the items 54 being carried by the apparatus 52 in the carrying space 120 will not make contact with or contact either the vehicle 14 and/or the towable vehicle 16, particularly when the vehicle 14 and towable vehicle 16 are making a turn (under normal driving conditions).

In the configuration of the second receiver assembly 218 shown in the figures, the second receiver assembly 218 comprises an elongated channel member 310 configured to selectively slide relative to the receiver support base 284, a support plate 312 that is secured to the channel member 310 by one or more plate connectors 314 and the second receiver 224, which is attached to or integral with the support plate 312, as shown in FIGS. 23, 31-34 and 39. The elongated channel member 310 is structured and arranged to slidably engage the slidable mounting mechanism 292 to move forward and rearward relative to the receiver support base 284 and to be securely clamped into the desired location by the slidable mounting mechanism 292 of the component shaft assembly 216. More specifically, the channel member 310 has engaging contact members 316 inside the interior area 318 of channel member 310 that are sized and configured to be engaged by the engaging plate 294 of the slidable mounting mechanism 292 when the user threads (in one embodiment) the plate connecting element 296 into the engaging plate 294, thereby pulling the engaging plate 294 downward against the engaging contact members 316 to clamp the channel member 310 against the receiver support base 284 to fix the position of the channel member 310 and, as a result, the second receiver 224, as shown in FIGS. 23 and 39. To function as required for the present invention, the engaging plate 294 must be sized and configured to fit in the interior area 318 of the channel member 310 between the opposing sidewalls 319 of the channel member 310 on the upper surface of the engaging contact members 316. In a preferred configuration, the engaging contact members 316 extend completely along the length of the channel member 310 between the first/forward end 320 and the second/rearward end 322 thereof, as shown in FIGS. 31-34.

The channel member 310 has a top surface 324 against which the support plate 312 is mounted and a bottom surface 326 that is configured to have openings or to be at least partially open (as shown in FIGS. 32-33) to allow the plate connecting element 296 to pass through to connect to the engaging plate 294 inside the tubular channel 300 of the channel member 310. In one embodiment, the channel member 310 is a steel Unistrut slotted channel available from Atkore International, Inc. which has a plurality of channel apertures (whether holes, slots or the like) along the top surface 324 and a lengthwise aperture with engaging contact members 316 along the bottom surface 326 as shown in FIGS. 31-34. Persons who are skilled in the relevant art will readily recognize that this form of member 310 can also be utilized by rotating the channel 180 degrees such that the lengthwise aperture with engaging contact members 316 is on the top surface 324 and the plurality of apertures are on the bottom surface 326. When rotated 180 degrees the member 310 can be connected to the receiver support base 284 by means of the plurality of channel apertures 328 and one or more plate connectors 314 while the support plate 312 is slidably connected to member 310 by means of one or more plate connectors 314 and the lengthwise aperture with engaging contact members 316. The channel 310 serves the same function in either orientation. As well known in the art, similar channel members are available from a wide variety of other manufacturers. The use and configuration of Unistrut® channels and like channel members are generally well known in the construction and related industries.

In another embodiment, the channel member 310 can be made from metal, plastic, fiberglass, composites or other materials into the general shape shown in the figures or as may otherwise be appropriate for the channel member 310 to function as required for use of the adapter 10 of the present invention. The channel apertures 328, or the lengthwise aperture with engaging contact members 316, are sized and configured to receive the plate connectors 314 to secure the support plate 312 to the channel member 310, as shown in FIGS. 31-33. The plurality of channel apertures 328, or lengthwise aperture with engaging contact members 316, allows the user to securely position the support plate 312 and, therefore, the second receiver 224 in the best position to take advantage of the carrying space 120 while preventing contact between the items 54 and the vehicle 14 and towable vehicle 16. The plate connectors 314 utilized in the configuration of second receiver assembly 218 shown in the figures comprises a connecting element 330, such as bolt or the like, and a cooperatively configured joining connector 332, such as a nut or the like, as best shown in FIG. 34, with connecting element 330 being sized and configured to fit through support plate apertures 334 in the support plate 312 and connect to the joining connector 332.

The support plate 312 comprises one or more metal or other strong and sufficiently stiff plate-like members that are sized and configured so the lower surface 336 thereof will abut against the top surface 324 of the channel member 310 and to support the second receiver 224 on the upper surface 338 of the support plate 312. As set forth above, the support plate 312 has at least one support plate apertures 334 therethrough to allow the connecting element 330 to connect to the joining connector 332 and secure the support plate 312, and the second receiver 224 that is attached thereto or integral therewith, to the channel member 310, as shown in FIGS. 31-34.

Figure 35:
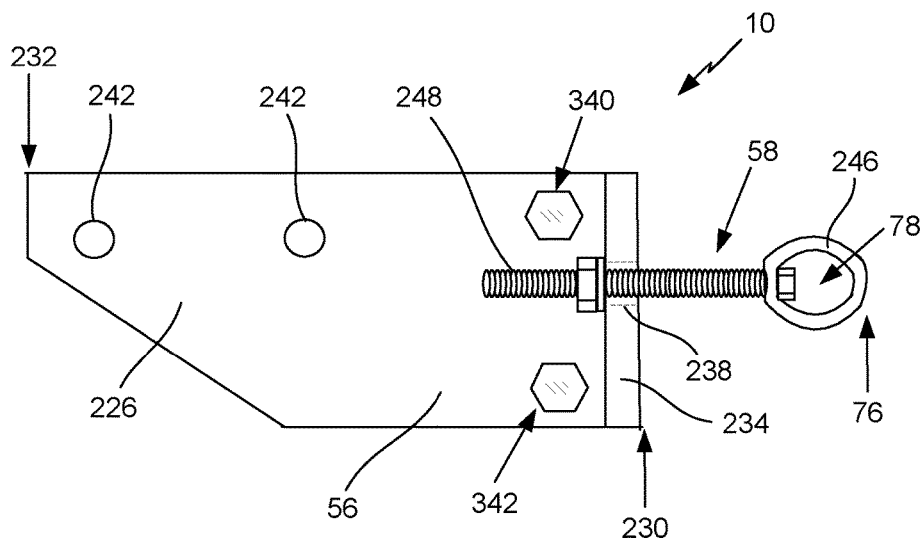
FIG. 35 is a right side view of an alternative configuration for the adapter of the fourth embodiment of the present invention.
Figure 37:
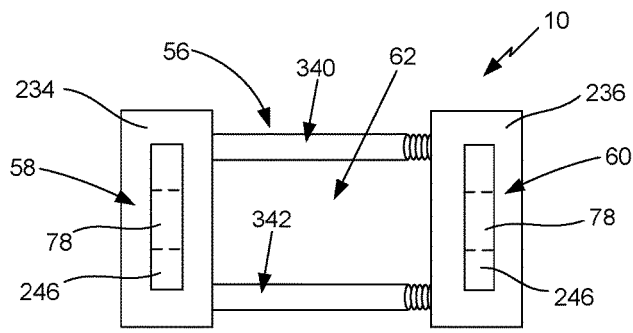
FIG. 37 is a front view of the adapter of FIG. 35.
Figure 38:
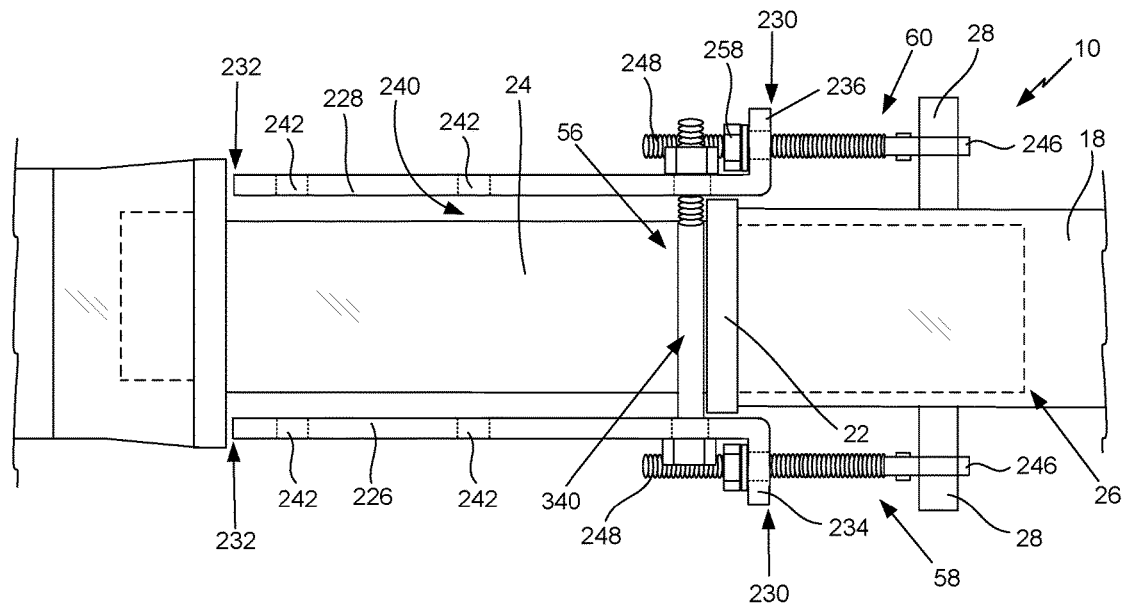
FIG. 38 is a top view of the adapter of FIG. 35 shown mounted on the tow hitch assembly of FIG. 2.
Figure 39:
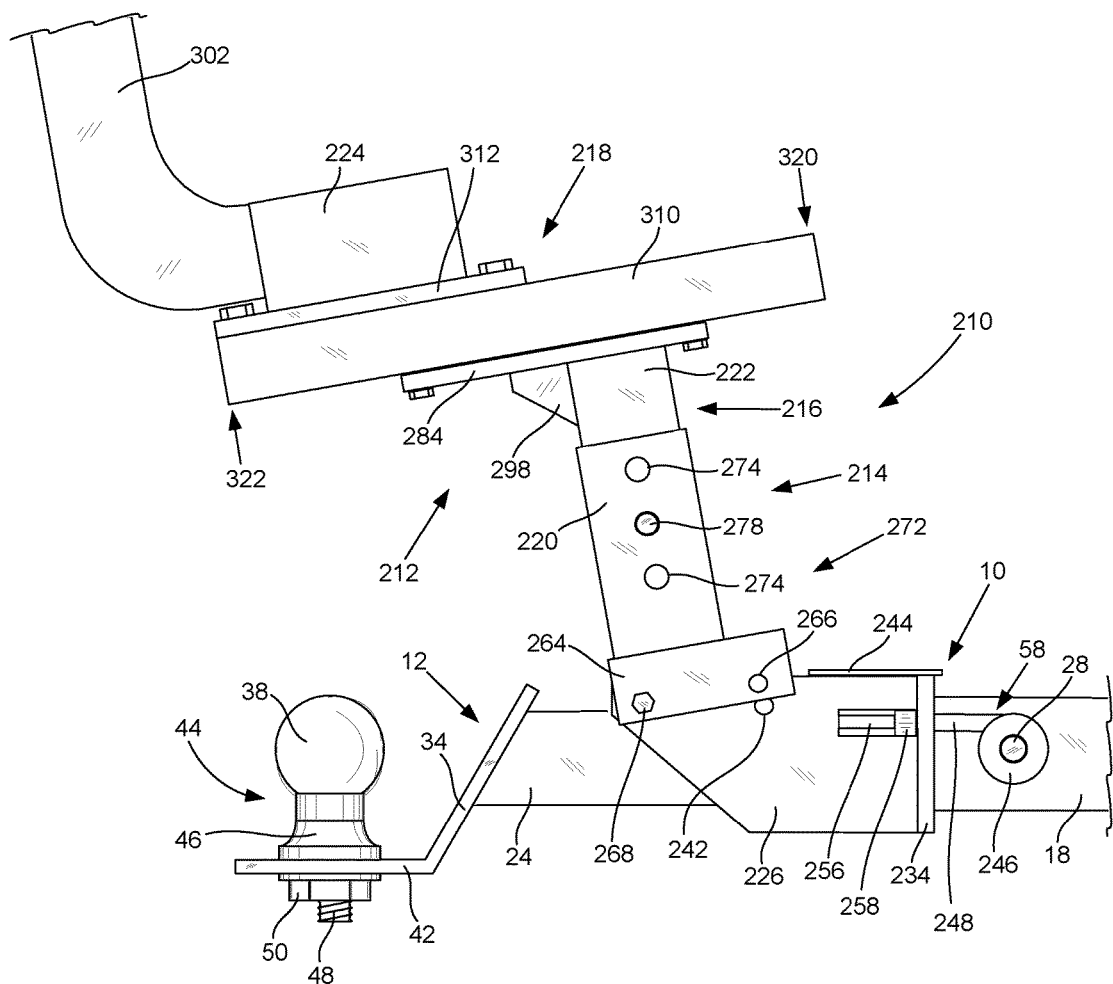
FIG. 39 is a right side view of the adapter of FIG. 24 shown in its generally rearwardly disposed position mounted on a vehicle tow hitch assembly and supporting an accessory component that is utilized to connect to an apparatus for supporting one or more items to be carried by or used with the vehicle having the tow hitch assembly.

An alternative configuration of adapter 10 of the fourth embodiment of the present invention is shown in FIGS. 35-38. This configuration of adapter 10 is particularly structured and arranged to carry lower weight loads on the apparatus 52 than the above configuration, but is generally less expensive to manufacture. The difference in the configuration of this adapter 10 is with regard to the adapter collar 56 and generally smaller sized and smaller gauge materials. Instead of an adapter collar 56 having a plurality of sidewalls 64 defining the collar opening 62, with a first side 66, second side 68, top side 70 and bottom side 72, as described above, with regard to FIGS. 23-33 and 39, adapter collar 56 of this configuration comprises a pair of elongated collar members, shown as first collar member 340 and second collar member 342, as best shown in FIGS. 35 and 37. Collar members 340/342 are sized and configured to extend between and interconnect the two side members 226/228 when the hitch shaft 24 is disposed in the shaft receiving area 240, as shown with regard to the first collar member 340 in FIG. 38, with the first collar member 340 being positioned so as to be at or against the upper surface 344 of the hitch shaft 24 and the second collar member 342 being positioned so as to be against the lower surface 346 of the hitch shaft 24 (with the upper surface 344 and lower surface 346 of hitch shaft 24 shown in FIG. 2) when the adapter 10 is mounted on the tow hitch assembly 12. The adapter 10 is secured and stabilized by the two side members 226/228 substantially abutting the sides of the collar 22 of the tubular receive 18 while the collar 56 of the adapter 10 is simultaneously drawn tightly against the rearward face of the collar 22 of the tubular receiver 18 by the adjustable length arms 58/60, as best shown in FIG. 38. The variable length of the collar members 340/342 function to rigidly secure the side members 226/228 against the sides of the collar 22 of the tubular receiver 18 to prevent rotational movement of the adapter 10 when the adapter 10 is mounted on the tow hitch assembly 12. As such, when the adapter 10 is mounted onto tow hitch assembly 12, as shown in FIG. 38, the collar 22 is tightly engaged between the two side members 226/228 and the two collar members 340/342 are against the upper 344 and lower 346 surfaces of the hitch shaft 24 at the rearward face of the collar 22 of the tubular receiver 18 to secure adapter 10 to the receiver 18 of tow hitch assembly 12.

In the embodiment shown in the figures, each of the collar members 340/342 comprise an elongated bolt 352 and a nut 354, as shown in FIG. 36 with regard to collar member 340. Each of the side members 226/228 are configured substantially the same as described above for the other configuration of the fourth embodiment, namely with regard to side members 226/228, mounting apertures 242 in the side members 226/228, outwardly projecting flanges 234/236 and flange apertures 238 in outwardly projecting flanges 234/236. The first forwardly extending arm 58 and second forwardly extending arm 60 are also configured the same, or substantially the same, as described above and shown in FIGS. 35-36 and 38 for the present configuration. In addition to the above, each of the side members 226/228 have a pair of cooperatively positioned collar apertures 356 that are sized and configured to allow the collar members 340/342 to pass therethrough to the opposite side of the collar 22 of the tubular receive 18, as best shown in FIGS. 35-36 and 38. In this embodiment, the side members 226/228 are positioned against the sides of the collar 22 of the tubular receiver 18 and the bolt 352 portion of the collar members 340/342 are placed through the collar apertures 356 to the opposite side member 226/228 and then the nut 354 is threaded onto the bolt 352 to clamp the collar 22 of the tubular receiver between the side members 226/228. Once the adapter 10 is clamped to the collar 22 of the tubular receiver 18, the user can attach the component base 264 to the side members 226/228 using bolts/nuts, screws or other attaching elements that are positioned through the mounting apertures 242 of the side members 226/228 to mount the accessory component 212 to the adapter 10.

In use, the user will typically attach the component tube assembly 214, with the component tube 220 attached thereto or integral therewith, to the adapter 10 using a pair of connecting elements, such as bolts, screws or the like, through the mounting apertures 242 in the adapter 10 and base apertures 266 in the component base 264, as best shown in FIG. 23. Alternatively, the component tube assembly 214 can be attached to the adapter 10 after the adapter 10 is mounted on the tow hitch assembly 12. To mount the adapter 10 on the tow hitch assembly 12, the hitch shaft 24 is positioned in the shaft receiving area 240 and then inserted through the collar opening 62 of the adapter collar 56, as shown in FIGS. 23, 28 and 38. The first/forward end 26 of the hitch shaft 24 is inserted into the receiver 18 through the tube opening 20 until the hitch apertures 32 are aligned with the receiver apertures 30. The arms 58/60 are adjusted until the arm apertures 78 are aligned with the receiver apertures 30 and hitch apertures 32. Once the apertures 30/32/78 are aligned, the locking device 28 is inserted through these apertures 30/32/78 and any pin or like device is inserted through the locking device 28 to secure the locking device 28 in apertures 30/32/78 to lock the hitch shaft 24 in the receiver 18 (as with the prior art use of the tow hitch assembly 12) with the collar 56 of the adapter 10 supported by the tow hitch assembly 12. The adapter 10 is moved forward by means of the adjustable length arms 246 until the forward end of the collar 56 is positioned in abutting relation to the rearward end of the collar 22 of the receiver 18, as shown in FIGS. 23, 28 and 38. In the first configuration of the fourth embodiment, the top extension member 244 will be positioned over the upper surface of the collar 22 of receiver 18, as shown in FIGS. 23 and 28.

With the adapter securely mounted on the tow hitch assembly 12, the user then attaches (if not previously done) the component tube assembly 214 to the adapter 10, as described above. The combination of the tow hitch assembly 12, adapter 10 and component tube assembly 214 will provide an open tubular aperture at the upper end 260 of the component tube 220. In one embodiment, a shaft of an apparatus 52, such as the first frame member 116 of the bicycle rack 110 of FIG. 5, can be placed inside the component tube 220 and then secured thereto using a component engaging device 278 through the connecting apertures 274 of the component tube 220 and the corresponding apertures in the shaft (i.e., first frame member 116). As described above, with the adapter 10 and component tube assembly 214 of the present invention, the user can pivot the component tube 220 and any apparatus 52, including the apparatuses 52 shown in FIGS. 5 and 16-18, and any items 54 supported on the apparatus 52 between the upwardly disposed position 270 shown in FIG. 23 and the generally rearwardly disposed position 272 shown in FIG. 39. In a preferred use of the present invention, however, the accessory component 212 is utilized with the new adapter 10.

In the embodiment shown in FIGS. 23-39, the component shaft assembly 216 is connected to the component tube assembly 214 and the second receiver assembly 218 is attached to the adapter 10 to provide a second receiver 224 having one or both of a second/rearwardly facing opening 308 and a first/forwardly facing opening 309 that can receive a support shaft 302 of an apparatus 52, as shown in FIGS. 23 and 39. The component shaft 222 of the component shaft assembly 216 is inserted into the component tube 220, the user adjusts the height of the receiver support base 284 so the second receiver 224 will be at the desired height (i.e., to avoid the bumper of the vehicle 14) and the component engaging device 278 is inserted through the connecting apertures 274 of the component tube 220 and the shaft aperture 276 of the component shaft 222 to secure the component shaft assembly 218 to the component tube assembly 216, as shown in FIGS. 23 and 39.

Once the component shaft assembly 216 is securely attached to the component tube assembly 214, the user can then mount the second receiver assembly 218 to the receiver support plate 284 of the component shaft assembly 216, as shown in FIGS. 23 and 39. Alternatively, the second receiver assembly 218 can be attached to the receiver support plate 284 prior to securing the component shaft assembly 216 to the component tube assembly 214. In the embodiment shown in the figures, the user loosens the slidable mounting mechanism 292 to allow the engaging plate 294 thereof to be positioned in the interior area 318 of the channel member 310 on top of the engaging contact members 316, with these components best shown in FIGS. 30-33. Once the channel member 310 is slid forward or rearward as desired by the user so the apparatus 52 and items 54 will not contact or be contacted by the vehicle 14 or towable vehicle 16 during use (particularly turns) when the apparatus 52 and items 54 are in the carrying space 120. The user then operates the slidable mounting mechanism 292 to clamp the engaging plates 294 against the upper surface of the engaging contact members 216 to securely attach the channel member 310 to the receiver support base 284, thereby securing the second receiver assembly 218 to the component shaft assembly 216 (which is attached to the tow hitch assembly 12) by engagement with the adapter 10 and component tube assembly 214, as shown in FIGS. 23 and 39. If not already mounted to the channel member 310, the user can mount the second receiver 224 to the channel member 310 using the plate connectors 314, by placing the elongated portion of the connecting elements 330 through the support plate apertures 334 of the support plate 312 and the desired channel apertures 228 and securing the joining connector 332 to the connecting elements 330, as best shown in FIGS. 30-31. If the second receiver 224 was previously attached to the channel member 310 but not in the desired position, the user can loosen or disconnect the support plate 312 from the channel member 310 and move it forward or rearward as desired to properly position the second receiver 224. Once the second receiver 224 is in place on the channel member 310, the user inserts the support shaft 302 of the apparatus 52 into the tubular channel 300 and secures the support shaft 302 to the second receiver 224 to secure the apparatus 52 to the adapter 10 on the tow hitch assembly 12 of the vehicle 14 so one or more items 54 can be carried by the vehicle 14 and/or utilized with the vehicle 14.

As will be readily apparent to persons skilled in the art, a number of advantages are provided by the support assembly 210 of the present invention, in addition to being able to securely mount an apparatus 52 to a tow hitch assembly 12. One major advantage is providing a second receiver 224 with rearward facing opening 308 and forward facing opening 309 that can each be utilized to receive and carry an apparatus 52, which can be utilized for carrying items 54, that does not use or conflict with the use of the receiver 18 associated with the vehicle 14. In addition, the adapter 10 of the fourth embodiment allows use of the accessory component 212 that can be pivoted from the upwardly disposed position 270 of FIG. 23 and the generally rearwardly disposed position 272 of FIG. 39 to allow the user to more conveniently access the back of the vehicle 14 without having to remove the apparatus 52 from the tow hitch assembly 12 and, in some circumstances, the items 54. The new support assembly 210 of the present invention also allows the user to adjust the up/down position of the second receiver assembly 218, and therefore the second receiver 224 with its rearward 308 and/or forward 309 facing openings, to avoid contact with the bumper or other component of the vehicle 14. The new support assembly 210 allows the user to adjust the forward/rearward position of the second receiver 224 so he or she can position the apparatus 52 and items 54 in a manner such that they will not contact the vehicle 14 and towable vehicle 16, particularly during turns. The adapter 10 and accessory component 212 can be made out of a wide variety of materials and in a variety of different sizes to enable the user to utilize the present invention with a variety of different sizes, weights and configurations of tow hitch assemblies 12, vehicles 14, apparatuses 52 and items 54.

Figure 40:
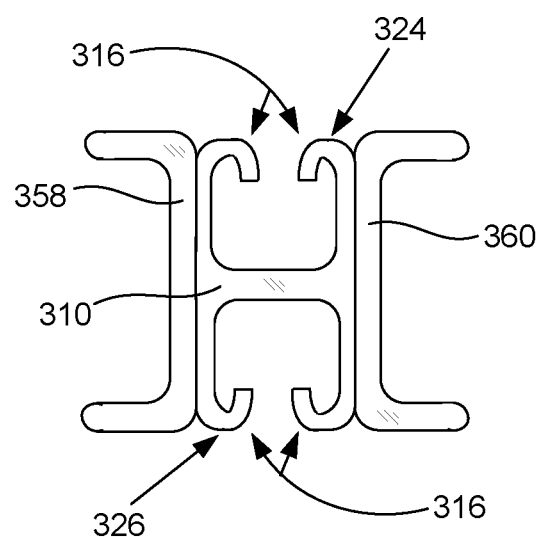
FIG. 40 is an end view of an alternative configuration for the channel member utilized with the fourth embodiment of the present invention.

In another configuration of the adapter 10 of the fourth embodiment, which is shown in FIG. 40, the channel member 310 is a Unistrut type of member that is supplied in the form of two members of cross section similar to that shown in FIG. 33 which are connected back-to-back such that the channel member 310 has engaging contact members 316 which extend completely along the length of channel member 310 between the first/forward end 320 and the second/rearward end 322 thereof on both the top surface 324 and bottom surface 326 of channel member 310. The channel member 310 is slidably connected to both the support plate 312 and the receiver support base 284, through the engaging contact members 316 on both the top surface 324 of channel member 310 and bottom surface 326 of channel member 310, by means of the plate connecting elements 296 on the receiver support base 284 and the connecting elements 296 on the support plate 312 shown in FIGS. 23 and 30. The use of a slidable connection between the receiver support base 284 and channel member 310 in conjunction with a slidable connection between the support plate 312 and channel member 310 increases the flexibility and ease of securely positioning the second receiver 224 in the best position to receive the support shaft 302 of the apparatus 52 (as shown in FIG. 23). In a preferred configuration, the channel member 310 is strengthened by attaching reinforcing elements 358 and 360, by welding or other means, to the sides of the channel member 310, as shown in FIG. 40. The reinforcing elements 358/360 may be a steel plate, steel angle, steel channel or the like and made of other suitable materials.

While there are shown and described herein one or more specific forms of the invention, it will be readily apparent to persons who are skilled in the relevant art that the invention is not so limited. Instead, the present invention is readily susceptible to various modifications and rearrangements in design and materials without departing from the spirit and scope of the present invention. In particular, it should be noted that the present invention is subject to modification with regard to any dimensional relationships set forth herein and modifications in assembly, materials, size, shape and use. For instance, there are numerous components that are described in the written materials and drawings that can be replaced with equivalent functioning components to accomplish the objectives and provide the various aspects of the present invention.

What is claimed is:

1. A support assembly for supporting an apparatus on a tow hitch assembly attached to a vehicle, with the tow hitch assembly having a receiver defining a rearwardly facing tube opening that receives a hitch shaft of a towable vehicle, with the hitch shaft being received in the tube opening when the towable vehicle is being towed behind the vehicle, said support assembly comprising:
   a component tube having a lower end attached to or integral with the tow hitch assembly and an upper end upwardly disposed above the tow hitch assembly;
   an elongated channel member attached to or integral with said component tube; and
   a second receiver attached to or integral with said elongated channel, said second receiver having a first end and a second end with at least one of a forward facing opening at said first end of said second receiver and a rearward facing opening at said second end of said second receiver, each of said forward facing opening and said rearward facing opening being sized and configured to receive a support shaft of the apparatus so as to support the apparatus on the tow hitch assembly without interfering with the ability of the hitch shaft to be received in the tube opening of the receiver so as to allow the tow hitch assembly to be utilized to support the apparatus and simultaneously tow a towable vehicle with the vehicle.

2. The support assembly of claim 1, wherein said second receiver is moveably attached to said channel member so as to move forwardly and rearwardly relative to the vehicle to beneficially position the apparatus in a carrying space between the vehicle and the towable vehicle.

3. The support assembly of claim 2, wherein said second receiver is slidably attached to said channel member.

4. The support assembly of claim 1, wherein said channel member has a forward end and a rearward end, said second receiver and said channel member cooperatively configured to moveably position said second receiver between said forward end and said rearward end of said channel member.

5. The support assembly of claim 4, wherein said channel member is slidably mounted to a cooperatively configured component shaft assembly that is attached to or integral with said component tube.

6. The support assembly of claim 5, wherein said component shaft assembly comprises a component shaft that is received in said component tube through said upper end thereof so as to support said channel member and said second receiver above said component tube.

7. The support assembly of claim 6, wherein component tube and said component shaft are cooperatively configured so said component shaft is moveably disposed in said component tube to adjust the height of said second receiver relative to the tow hitch assembly.

8. The support assembly of claim 1 further comprising an adapter disposed between said component tube and said tow hitch assembly, said adapter structured and arranged to be mounted on said tow hitch assembly and to support said second receiver above said tow hitch assembly in a manner that does not interfere with use of the tube opening to receive the hitch shaft and the vehicle to tow the towable vehicle.

9. The support assembly of claim 8, wherein said component tube is pivotally attached to said adapter to move said component tube between an upwardly disposed position and a rearwardly disposed position so as to tilt the apparatus and any items supported by the apparatus rearwardly away from the vehicle when the apparatus is mounted to said second receiver and said adapter is mounted on the tow hitch assembly.

10. The support assembly of claim 8, wherein said adapter comprises:
    (a) an adapter collar defining a collar opening sized and configured to be received on and engage the tow hitch assembly without interfering with the ability of the hitch shaft to be received in the tube opening of the receiver, said adapter collar sized and configured to be placed in abutting relation with a collar of the receiver so as to align said collar opening with the tube opening;
    (b) an elongated first arm associated with a first side of said adapter collar, said first arm having a first end at or near said adapter collar and a second end extending forwardly therefrom generally parallel to the receiver and to the hitch shaft when said adapter is received on the tow hitch assembly, said first arm having an arm aperture at or near said second end thereof; and
    (c) an elongated second arm associated with a second side of said adapter collar, said second arm having a first end at or near said adapter collar and a second end extending forwardly therefrom generally parallel to the receiver and to the hitch shaft when said adapter is received on the tow hitch assembly, said second arm having an arm aperture at or near said second end thereof,
    wherein said first arm and said second arm are cooperatively sized and configured with said adapter collar so said arm apertures of said first arm and said second arm will be aligned in corresponding relation with a pair of cooperatively positioned receiver apertures in the receiver and a pair of cooperatively positioned hitch apertures in the hitch shaft so an elongated locking device can be received through each of said arm apertures, the receiver apertures and the hitch apertures to removably secure said adapter to the tow hitch assembly to allow transport of the apparatus by the vehicle when said adapter is placed on the tow hitch assembly with the hitch shaft received in the tube opening of the receiver.

11. The support assembly of claim 10, wherein said adapter collar is defined by a first collar member and a second collar member, said first collar member and said second collar member positioned in spaced apart relation so as to receive the hitch shaft therebetween when said adapter is mounted on the tow hitch assembly.

12. The support assembly of claim 10 further comprising a component base disposed between and interconnecting said component tube and said adapter, said component base structured and arranged to attach said component tube to each of said first side member and said second side member of said adapter.

13. The support assembly of claim 10 further comprising a first side member attached to or integral with said first side of said adapter collar, a second side member attached to or integral with said second side of said adapter collar, each of said first side member and said second side member positioned so as to extend generally parallel to the receiver and to the hitch shaft when said adapter is received on the tow hitch assembly, each of said first side member and said second side member having a first end extending forward of said adapter collar and a second end extending rearward from said adapter collar, said first arm secured to said first side member so as to extend forwardly from said first end thereof, said second arm secured to said second side member so as to extend forwardly from said first end thereof, wherein said first side member and said second side member are cooperatively sized and configured with said adapter collar so the collar of the receiver will be disposed between said first side member and said second side member when said adapter collar is in abutting relation with the collar of the receiver.

14. The support assembly of claim 13 further comprising a first outwardly projecting flange at the first end of said first side member and a second outwardly projecting flange at the first end of said second side member, said first end of said first arm in engaging relation with said first flange so as to dispose said second end thereof forwardly from said first flange, said first end of said second arm in engaging relation with said second flange so as to dispose said second end thereof forwardly from said second flange.

15. The support assembly of claim 14, wherein each of said first arm and said second arm are structured and arranged to be adjustable in length so as to selectively position said adapter collar forwardly or rearwardly relative to the vehicle and to the collar of the receiver.

16. A support assembly for supporting an apparatus on a tow hitch assembly attached to a vehicle, with the tow hitch assembly having a receiver defining a rearwardly facing tube opening that receives a hitch shaft of a towable vehicle, with the hitch shaft being received in the tube opening when the towable vehicle is being towed behind the vehicle, said support assembly comprising:
    an adapter structured and arranged to be mounted on the tow hitch assembly without interfering with the ability of the hitch shaft to be received in the tube opening of the receiver so as to allow the tow hitch assembly to be utilized to support the apparatus and simultaneously tow a towable vehicle with the vehicle, said adapter having an adapter collar defining a collar opening sized and configured to be received on and engage the tow hitch assembly, a first side member attached to or integral with a first side of said adapter collar, an elongated first arm associated with said first side member, a second side member attached to or integral with a second side of said adapter collar and an elongated second arm associated with said second side member, each of said first arm and said second arm being structured and arranged to attach said adapter to the receiver of the tow hitch assembly with the adapter collar abutting a collar associated with the receiver with the collar of the receiver positioned between each of said first side member and said second side member;

a component tube having a lower end attached to or integral with the adapter and an upper end upwardly disposed above the tow hitch assembly; and a second receiver attached to or integral with said component tube, said second receiver having a first end and a second end with at least one of a forward facing opening at said first end of said second receiver and a rearward facing opening at said second end of said second receiver, each of said forward facing opening and said rearward facing opening being sized and configured to receive a support shaft of the apparatus so as to support the apparatus on the tow hitch assembly in a carrying space defined between the vehicle and the towable vehicle.

17. The support assembly of claim 16, wherein said second receiver is moveably attached to said component tube so as to move forwardly and rearwardly relative to the vehicle to beneficially position the apparatus in the carrying space between the vehicle and the towable vehicle.

18. The support assembly of claim 16, wherein each of said first arm and said second arm are structured and arranged to be adjustable in length so as to selectively position said adapter collar forwardly or rearwardly relative to the vehicle and to the collar of the receiver.

19. The support assembly of claim 16, wherein said second receiver is mounted to an elongated channel member that is attached to or integral with said component tube.

20. The support assembly of claim 19, wherein said channel member is mounted to a component shaft assembly that is attached to or integral with said component tube, said component shaft assembly having a component shaft that is received in said component tube through said upper end thereof so as to support said channel member and said second receiver above said component tube.

21. A support assembly for supporting an apparatus on a tow hitch assembly attached to a vehicle, with the tow hitch assembly having a receiver defining a rearwardly facing tube opening that receives a hitch shaft of a towable vehicle, with the hitch shaft being received in the tube opening when the towable vehicle is being towed behind the vehicle, said support assembly comprising:

an adapter structured and arranged to be mounted on the tow hitch assembly without interfering with the ability of the hitch shaft to be received in the tube opening of the receiver so as to allow the tow hitch assembly to be utilized to support the apparatus and simultaneously tow a towable vehicle with the vehicle;

a component tube having a lower end attached to or integral with the adapter and an upper end upwardly disposed above the tow hitch assembly; and a second receiver attached to or integral with said component tube, said second receiver having a first end and a second end with at least one of a forward facing opening at said first end of said second receiver and a rearward facing opening at said second end of said second receiver, each of said forward facing opening and said rearward facing opening being sized and configured to receive a support shaft of the apparatus so as to support the apparatus on the tow hitch assembly in a carrying space defined between the vehicle and the towable vehicle, wherein said adapter comprises: (a) an adapter collar defining a collar opening sized and configured to be received on and engage the tow hitch assembly without interfering with the ability of the hitch shaft to be received in the tube opening of the receiver, said adapter collar sized and configured to be placed in abutting relation with a collar of the receiver so as to align said collar opening with the tube opening; (b) a first side member attached to or integral with a first side of said adapter collar and positioned so as to extend generally parallel to the receiver and to the hitch shaft when said adapter is received on the tow hitch assembly, said first side member having a first end extending forward of said adapter collar and a second end extending rearward from said adapter collar, said first side member having a first outwardly projecting flange at the first end thereof; (c) an elongated first arm associated with said first side member, said first arm having a first end and a second end, said second end of said first arm in engaging relation with said first flange so as to dispose said first end thereof forwardly from said first flange, said first arm having an arm aperture at or near said first end thereof; (d) a second side member attached to or integral with a second side of said adapter collar and positioned so as to extend generally parallel to the receiver and to the hitch shaft when said adapter is received on the tow hitch assembly, said second side member having a first end extending forward of said adapter collar and a second end extending rearward from said adapter collar, said second side member having a second outwardly projecting flange at the second end thereof; and (e) an elongated second arm associated with said second side member, said second arm having a first end and a second end, said second end of said second arm in engaging relation with said second flange so as to dispose said first end thereof forwardly from said second flange, said second arm having an arm aperture at or near said first end thereof; wherein said first side member and said second side member are cooperatively sized and configured with said adapter collar so the collar of the receiver will be disposed between said first side member and said second side member when said adapter collar is in abutting relation with the collar of the receiver and said arm apertures of said first arm and said second arm will be aligned in corresponding relation with a pair of cooperatively positioned receiver apertures in the receiver and a pair of cooperatively positioned hitch apertures in said hitch shaft so an elongated locking device can be received through each of said arm apertures, the receiver apertures and the hitch apertures to removably secure said adapter to the tow hitch assembly to allow transport of the apparatus by the vehicle when said adapter is placed on the tow hitch assembly with the hitch shaft received in the tube opening of the receiver.

22. A support assembly for supporting an apparatus on a tow hitch assembly attached to a vehicle, with the tow hitch assembly having a receiver defining a rearwardly facing tube opening that receives a hitch shaft of a towable vehicle, with the hitch shaft being received in the tube opening when the towable vehicle is being towed behind the vehicle, said support assembly comprising:
   a component tube having a lower end attached to or integral with the tow hitch assembly and an upper end upwardly disposed above the tow hitch assembly; and
   a second receiver slidably attached to said component tube, said second receiver having a first end and a second end with at least one of a forward facing opening at said first end of said second receiver and a rearward facing opening at said second end of said second receiver, each of said forward facing opening and said rearward facing opening being sized and configured to receive a support shaft of the apparatus so as to support the apparatus on the tow hitch assembly without interfering with the ability of the hitch shaft to be received in the tube opening of the receiver so as to allow the tow hitch assembly to be utilized to support the apparatus and simultaneously tow a towable vehicle with the vehicle, wherein said second receiver is able to slide forwardly and rearwardly relative to the vehicle to beneficially position the apparatus in a carrying space between the vehicle and the towable vehicle.

23. The support assembly of claim 22 further comprising an adapter disposed between said component tube and said tow hitch assembly, said adapter structured and arranged to be mounted on said tow hitch assembly and to support said second receiver above said tow hitch assembly in a manner that does not interfere with use of the tube opening to receive the hitch shaft and the vehicle to tow the towable vehicle.

24. The support assembly of claim 23, wherein said component tube is pivotally attached to said adapter to move said component tube between an upwardly disposed position and a rearwardly disposed position so as to tilt the apparatus and any items supported by the apparatus rearwardly away from the vehicle when the apparatus is mounted to said second receiver and said adapter is mounted on the tow hitch assembly.

25. The support assembly of claim 23, wherein said adapter comprises:
   (a) an adapter collar defining a collar opening sized and configured to be received on and engage the tow hitch assembly without interfering with the ability of the hitch shaft to be received in the tube opening of the receiver, said adapter collar sized and configured to be placed in abutting relation with a collar of the receiver so as to align said collar opening with the tube opening;
   (b) an elongated first arm associated with a first side of said adapter collar, said first arm having a first end at or near said adapter collar and a second end extending forwardly therefrom generally parallel to the receiver and to the hitch shaft when said adapter is received on the tow hitch assembly, said first arm having an arm aperture at or near said second end thereof; and
   (c) an elongated second arm associated with a second side of said adapter collar, said second arm having a first end at or near said adapter collar and a second end extending forwardly therefrom generally parallel to the receiver and to the hitch shaft when said adapter is received on the tow hitch assembly, said second arm having an arm aperture at or near said second end thereof,
   wherein said first arm and said second arm are cooperatively sized and configured with said adapter collar so said arm apertures of said first arm and said second arm will be aligned in corresponding relation with a pair of cooperatively positioned receiver apertures in the receiver and a pair of cooperatively positioned hitch apertures in the hitch shaft so an elongated locking device can be received through each of said arm apertures, the receiver apertures and the hitch apertures to removably secure said adapter to the tow hitch assembly to allow transport of the apparatus by the vehicle when said adapter is placed on the tow hitch assembly with the hitch shaft received in the tube opening of the receiver.

26. The support assembly of claim 25, wherein each of said first arm and said second arm are structured and arranged to be adjustable in length so as to selectively position said adapter collar forwardly or rearwardly relative to the vehicle and to the collar of the receiver.

27. A support assembly for supporting an apparatus on a tow hitch assembly attached to a vehicle, with the tow hitch assembly having a receiver defining a rearwardly facing tube opening that receives a hitch shaft of a towable vehicle, with the hitch shaft being received in the tube opening when the towable vehicle is being towed behind the vehicle, said support assembly comprising:
   a component tube having a lower end pivotally attached to the tow hitch assembly and an upper end upwardly disposed above the tow hitch assembly;
   a second receiver slidably attached to said component tube, said second receiver having a first end and a second end with at least one of a forward facing opening at said first end of said second receiver and a rearward facing opening at said second end of said second receiver, each of said forward facing opening and said rearward facing opening being sized and configured to receive a support shaft of the apparatus so as to support the apparatus on the tow hitch assembly without interfering with the ability of the hitch shaft to be received in the tube opening of the receiver so as to allow the tow hitch assembly to be utilized to support the apparatus and simultaneously tow a towable vehicle with the vehicle; and
   an adapter disposed between said component tube and said tow hitch assembly, said adapter structured and arranged to be mounted on said tow hitch assembly and to support said second receiver above said tow hitch assembly in a manner that does not interfere with use of the tube opening to receive the hitch shaft and the vehicle to tow the towable vehicle,
   wherein said component tube moves between an upwardly disposed position and a rearwardly disposed position to tilt the apparatus and any items supported by the apparatus rearwardly away from the vehicle when the apparatus is mounted to said second receiver and said adapter is mounted on the tow hitch assembly.

* * * * *